United States Patent
Ichihashi et al.

(10) Patent No.: US 12,469,312 B2
(45) Date of Patent: Nov. 11, 2025

(54) CELL TRACKING METHOD, IMAGE PROCESSING DEVICE, AND PROGRAM

(71) Applicant: NIKON CORPORATION, Tokyo (JP)

(72) Inventors: Toru Ichihashi, Yokohama (JP); Hiroaki Kii, Fujisawa (JP); Tetsuomi Takasaki, Sagamihara (JP); Takayuki Uozumi, Machida (JP); Yoichi Yamazaki, Yokohama (JP); Masaki Kinehara, Yokohama (JP)

(73) Assignee: NIKON CORPORATION, Tokyo (JP)

( * ) Notice: Subject to any disclaimer, the term of this patent is extended or adjusted under 35 U.S.C. 154(b) by 462 days.

(21) Appl. No.: 17/509,882

(22) Filed: Oct. 25, 2021

(65) Prior Publication Data
US 2022/0114819 A1 Apr. 14, 2022

Related U.S. Application Data

(63) Continuation of application No. PCT/JP2020/017426, filed on Apr. 23, 2020.

(30) Foreign Application Priority Data

Apr. 26, 2019 (JP) ................. 2019-085323

(51) Int. Cl.
  G06V 20/69 (2022.01)
  G06T 7/246 (2017.01)
(52) U.S. Cl.
  CPC .......... G06V 20/695 (2022.01); G06T 7/251 (2017.01); G06T 2207/10016 (2013.01); G06T 2207/10056 (2013.01); G06T 2207/30024 (2013.01)
(58) Field of Classification Search
  CPC .......... G06V 20/695; G06T 7/251; G06T 2207/10016; G06T 2207/10056;
(Continued)

(56) References Cited

U.S. PATENT DOCUMENTS

2007/0298450 A1* 12/2007 Chenn ............... G01N 33/5029
                                                          435/378
2009/0141960 A1*  6/2009 Yamamoto ......... G01N 21/6458
                                                          382/133
(Continued)

FOREIGN PATENT DOCUMENTS

EP       2034297 A1    3/2009
JP    2006-238802 A    9/2006
(Continued)

OTHER PUBLICATIONS

Dec. 6, 2022 Office Action issued in Japanese Patent Application No. 2021-516190.
Jul. 21, 2020 International Search Report issued in International Patent Application No. PCT/JP2020/017426.
Jul. 21, 2020 Written Opinion of the International Searching Authority issued in International Patent Application No. PCT/JP2020/017426.
(Continued)

Primary Examiner — Wesley J Tucker
Assistant Examiner — Han Hoang
(74) Attorney, Agent, or Firm — Oliff PLC

(57) ABSTRACT

A cell tracking method for performing cell tracking on the basis of a plurality of cell images captured in time series, including an extraction process of extracting a tracking region corresponding to the cell for each cell images; a tracking process of calculating a change information in a position of the extracted tracking region and tracking the cell on the basis of the change information; a determination process of determining whether or not the cell as a tracking target is in a cell division state on the basis of the cell image; and an analysis process of analyzing a movement state of the cell on the basis of the change information from which the change information in a period of the cell division state is excluded when the cell is determined to be in the cell division state in the determination process.

13 Claims, 18 Drawing Sheets

(58) Field of Classification Search
CPC . G06T 2207/30024; G06T 2207/30241; G06T 7/246; C12M 41/36; C12M 41/48
See application file for complete search history.

(56) References Cited

U.S. PATENT DOCUMENTS

| | | | |
|---|---|---|---|
| 2012/0070060 A1* | 3/2012 | Mahato | G06T 7/277 |
| | | | 382/133 |
| 2015/0111291 A1 | 4/2015 | Aragaki | |
| 2018/0365841 A1 | 12/2018 | Bozorgtabar et al. | |
| 2020/0110924 A1* | 4/2020 | Shinoda | G06V 10/764 |

FOREIGN PATENT DOCUMENTS

| | | |
|---|---|---|
| JP | 2007-327843 A | 12/2007 |
| JP | 2009-089630 A | 4/2009 |
| JP | 2014-16666 A | 1/2014 |
| JP | 2017-023055 A | 2/2017 |

OTHER PUBLICATIONS

Paduano et al.; "Time-Lapse Phase-Contrast Microscopy Fibroblast Automated Tracking"; Imaging Systems and Techniques (IST), 2010, IEEE International Conference ON, IEEE, Piscataway, NJ, USA, Jul. 1, 2010 (Jul. 1, 2010), pp. 284-289, XP031732656, ISBN: 978-1-4244-6492-0.

De Hauwer et al.; "Dynamic Characterization of Glioblastoma Cell Motility"; Biochemical and Biophysical Research Communications; vol. 232; pp. 267-272; 1997, XP002235057, ISSN: 0006-291X.

Palamidessi et al.; "Understanding biological dynamics: following cells and molecules to track functions and mechanisms", European Biophysics Journal; With Biophysics Letter, vol. 39; pp. 947-957; 2010, XP019799775, ISSN: 1432-1017.

Apr. 24, 2023 Extended Search Report issued in European Patent Application No. EP 20 79 6277.0.

* cited by examiner

CELL TRACKING METHOD, IMAGE PROCESSING DEVICE, AND PROGRAM

TECHNICAL FIELD

The present invention relates to a cell tracking method, an image processing device, and a program.

Priority is claimed on Japanese Patent Application No. 2019-85323, filed Apr. 26, 2019, the content of which is incorporated herein by reference.

BACKGROUND ART

A cell tracking technology for measuring the position of an imaged cell at each imaged point in time during image analysis for an image of cells is known (Patent Literature 1). For example, in the cell tracking technology, when cell tracking with division has been performed, tracking may be continued for one of the cells after cell division and tracking may be newly started for another cell in the related art. In such a case, since the center of gravity moves instantaneously at the time of cell division, noise can be caused in, for example, analysis of a cell movement state through tracking. It is required to improve the accuracy of analysis of the cell movement state, for example.

CITATION LIST

Patent Literature

[Patent Literature 1]
Japanese Unexamined Patent Application, First Publication No. 2006-238802

SUMMARY OF INVENTION

Technical Problem

Solution to Problem

One aspect of the present invention is a cell tracking method for tracking cells on the basis of a plurality of cell images captured in time series, the cell tracking method including: an extraction process of extracting a tracking region corresponding to the cell for each of the plurality of cell images; a tracking process of calculating a change information in a position of the tracking region extracted in the extraction process on the basis of the plurality of cell images and tracking the cell on the basis of the change information; a determination process of determining whether or not the cell as a tracking target is in a cell division state on the basis of the cell image; and an analysis process of analyzing a movement state of the cell on the basis of the change information from which the change information in a period of the cell division state is excluded when the cell is determined to be in the cell division state in the determination process.

Further, an aspect of the present invention is an image processing device, the image processing device including: a processor for performing a cell tracking process on the basis of a plurality of cell images captured in time series; and a memory encoded with instructions executed by the processor, wherein the instructions causing the processor to perform operations include: extracting a tracking region corresponding to the cell for each of the plurality of cell images; calculating a change information in a position of the extracted tracking region on the basis of the plurality of cell images and tracking the cell on the basis of the change information; determining whether or not the cell as a tracking target is in a cell division state on the basis of the cell image; and analyzing a movement state of the cell on the basis of the change information from which the change information in a period of the cell division state is excluded when the cell is determined to be in the cell division state.

One aspect of the present invention is a program for causing a computer for executing cell tracking on the basis of a plurality of cell images captured in time series to execute: an extraction step of extracting a tracking region corresponding to the cell for each of the plurality of cell images; a tracking step of calculating a change information in a position of the tracking region extracted in the extraction step on the basis of the plurality of cell images and tracking the cell on the basis of the change information; a determination step of determining whether or not a cell as a tracking target is in a cell division state on the basis of the cell image; and an analysis step of analyzing a movement state of the cell on the basis of the change information from which the change information in a period of the cell division state is excluded when the cell is determined to be in the cell division state in the determination step.

DESCRIPTION OF EMBODIMENTS

First Embodiment

Figure 1:
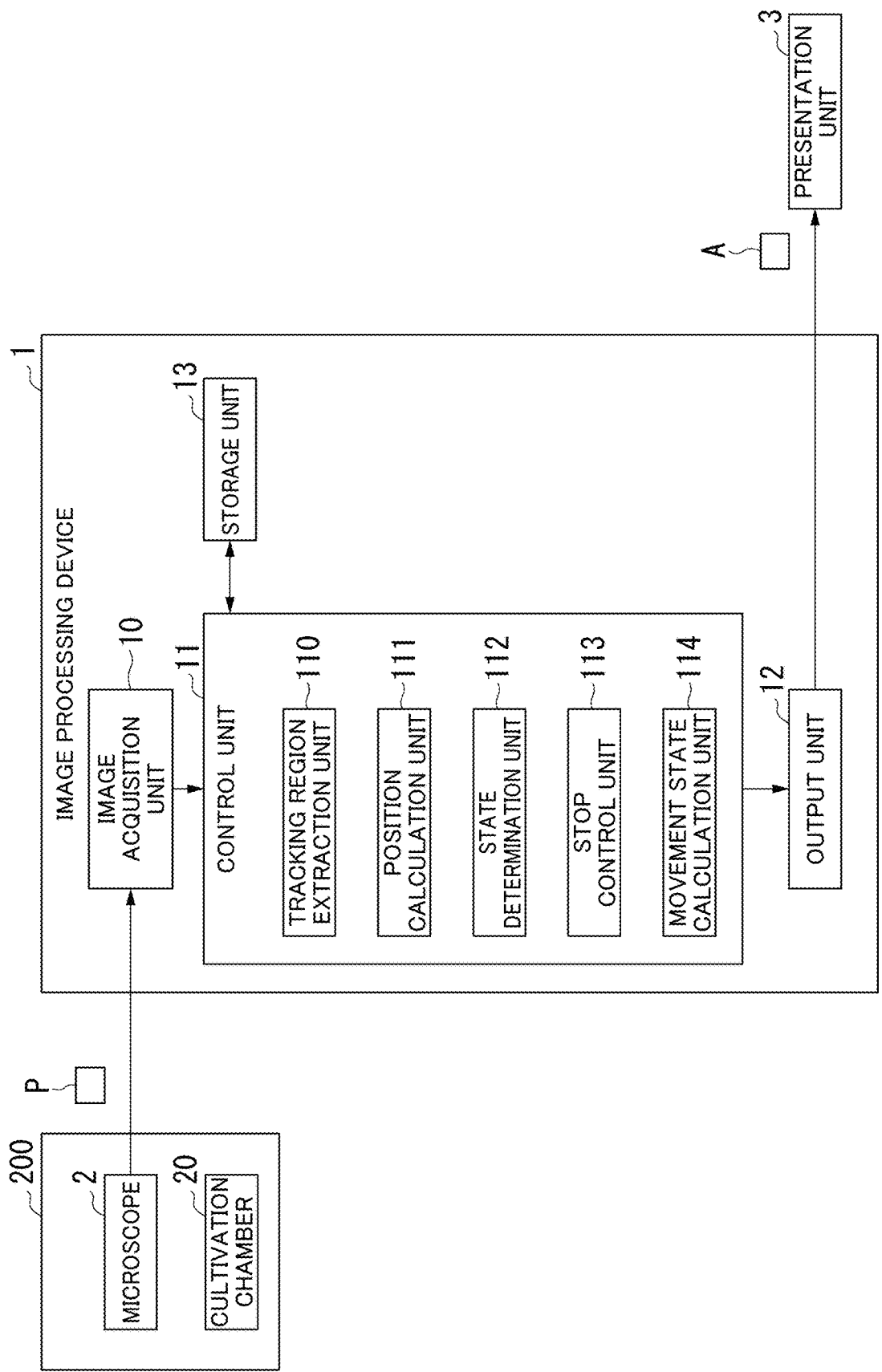
FIG. 1 is a diagram illustrating an example of a configuration of an image processing device according to a first embodiment.

Hereinafter, a first embodiment will be described in detail with reference to the drawings. FIG. 1 is a diagram illustrating an example of a configuration of an image processing device 1 according to the present embodiment. The image processing device 1 analyzes an image P, which is a plurality of images in which cells C are detected at a plurality of times (for example, times T1 to T7 to be described below), by tracking the cells C. The tracking of the cell C includes, for example, calculating and obtaining a trajectory of the cell C in the image P on the basis of a specific condition. The cell C is, for example, an adherent cell (for example, a mesenchymal stem cell, a nerve cell, or an epithelial cell). A tracking process in the present embodiment of the image processing device 1 may be executed for one cell C every hour, or for a plurality of cells C (for example, a first cell, a second cell, or third cell) in parallel every hour.

An automatic cultivation observation device 200 in the present embodiment includes a microscope 2 and a cultivation chamber (cultivation device) 20. The microscope 2 is an optical microscope, and is a phase contrast microscope, for example. The microscope 2, for example, performs phase contrast observation in dark contrast to detect one or more cells. The microscope 2 images the detected cell as an image P. The cultivation chamber 20 includes a chamber in which an internal temperature or humidity is managed by a control unit or the like in order to culture the cells C stored in a container. Further, in the automatic cultivation observation device 200 of the present embodiment, the microscope 2 and the cultivation chamber 20 may be placed separately, or the microscope 2 may be placed inside the cultivation chamber 20. In the present embodiment, the microscope 2 may have an apparatus configuration separated from the cultivation chamber 20.

The image P is, for example, a moving image consisting of a plurality of frames. Hereinafter, the i-th frame of the image P may be referred to as an image Pi or the like. The image P may be a time-lapse image taken at a plurality of shooting times.

The image processing device 1 includes an image acquisition unit 10, a control unit 11, an output unit 12, and a storage unit 13. The image processing device 1 is, for example, a computer. In the present embodiment, a case in which the image processing device 1 is included independently of the microscope 2 will be described as an example, but the present invention is not limited thereto. The image processing device 1 may be included integrally with the microscope 2.

The image acquisition unit 10 receives and acquires the image P output from the microscope 2.

The control unit 11 includes a tracking region extraction unit (region extraction unit) 110, a position calculation unit 111, a state determination unit 112, a stop control unit 113, and a movement state calculation unit 114.

The control unit 11 is realized by a central processing unit (CPU), and the tracking region extraction unit 110, the position calculation unit 111, the state determination unit 112, the stop control unit 113, and the movement state calculation unit 114 are respective modules realized by the CPU reading a program from a read only memory (ROM) and executing a process.

The tracking region extraction unit 110 extracts a region R of the cell (for example, a region R1, a region R2, or the like) from the image P in which the cell is imaged, using luminance information. The region R includes at least one of a tracking region TR in which a state of the luminance indicated by the luminance information is a first state X and a tracking stop region SR in which the state of the luminance indicated by the luminance information is a second state Y. Here, the luminance information is, for example, a luminance value based on a phase contrast of observation light of cells in the phase contrast microscope, and the state of the luminance indicated by the luminance information is, for example, a state indicated by this luminance value (for example, a state of a large value or a state of a small value). The luminance information may be a value indicating a luminance other than the luminance value and may be, for example, a contrast or a phase contrast before being converted into a luminance (for example, a brightness). For example, a predetermined region (for example, region R) of the image P is defined by one pixel or a plurality of pixels among all pixels constituting the image P. Further, for example, luminance information of the predetermined region (for example, the region R) in the image P may be each luminance value or an average luminance value of the plurality of pixels.

The first state X is, for example, a state in which a luminance value of a specific portion (for example, tracking region, or the like) in the image P is smaller than a predetermined value when the luminance value is compared with a predetermined value (for example, calculated). In the present embodiment, an example that is the first state X in which the luminance value is smaller than the predetermined value is an example in the case of dark contrast. The first state X includes, for example, a state in which the luminance value of the specific portion is relatively or absolutely lower than the predetermined value. For example, a luminance value of a background BG of a first frame of the image P (for example, a background BG1 to be described below) or a threshold value regarding a preset luminance value is used as the predetermined value. The luminance value of the background BG may be an average value of luminance values acquired from the entire background BG or may be a luminance value acquired from a specific portion of the background BG. An example of a case in which the average value of the luminance values acquired from the entire background BG of the first frame of the image P is commonly used as the predetermined value for all the frames included in the image P will be described in the present embodiment.

Further, as described above, the first state X includes, for example, a state in which the contrast is smaller than the predetermined value in the dark contrast. The contrast is, for example, a difference in luminance value based on a phase contrast of the observation light, a difference in light and dark, or shading in an image. In the present embodiment, the first state X is, for example, a state in which the luminance value based on the phase contrast is smaller than that of the background BG of the image P. Further, the tracking region TR includes a region in which the cell C as a tracking target is captured in the image P.

The tracking region extraction unit 110 extracts the region R on the basis of the luminance indicated by the luminance information. When the tracking region extraction unit 110 extracts, for example, the tracking region TR as the region R, the tracking region extraction unit 110 first extracts pixels of which a luminance value is smaller than that of the background BG from the image P. The tracking region extraction unit 110 detects a boundary (edge) on the basis of the extracted pixels. The tracking region extraction unit 110 determines a continuous curve indicating a boundary of the tracking region TR on the basis of the detected boundary (edge) to extract the tracking region TR.

The region R in the present embodiment is a region corresponding to one cell C. As described above, the cell C is, for example, an adherent cell, and the cell C becomes a floating cell at the time of division. The tracking region TR in which the state of the luminance indicated by the luminance information is the first state X is, for example, a region corresponding to the adherent cell. On the other hand, the tracking stop region SR in which the state of the luminance indicated by the luminance information is the second state Y is, for example, a region corresponding to floating cells.

The position calculation unit 111 calculates a temporal change TC in the position of the tracking region TR extracted by the tracking region extraction unit 110 on the basis of a plurality of frames of the image P. The position calculation unit 111 calculates the position of the tracking region TR on the basis of a representative point G of the tracking region TR. Here, the representative point G is one of the points included in the tracking region TR that representatively indicates the position of the tracking region TR in the image P. The representative point G is, for example, a center of gravity G1 of the tracking region TR including cells. The point includes one pixel of the image P.

The state determination unit 112 determines that a state of the luminance indicated by luminance information of the tracking region TR extracted by the tracking region extraction unit 110 is the second state Y different from the first state X, that is, determines whether or not the state of luminance of the tracking region TR (i.e., a target of tracking) has changed from the first state X to the second state Y. Here, the second state Y is, for example, a state in which a luminance value of a specific portion (for example, a tracking region) in the image P is larger than a predetermined value. In the present embodiment, an example of the second state Y in which the luminance value is larger than the predetermined value is an example of dark contrast. The second state Y includes, for example, a state in which the luminance value of the specific portion is relatively or absolutely higher than the predetermined value. Further, the second state Y includes, for example, a state in which the contrast is larger than the predetermined value in the dark contrast. In the present embodiment, the second state Y is, for example, a state in which the luminance value based on the phase contrast is larger than that of the background BG.

The stop control unit 113 causes the position calculation unit 111 to stop the calculation of the temporal change TC on the basis of a determination result of the state determination unit 112. In this case, for example, the stop control unit 113 causes the position calculation unit 111 to stop the calculation of the temporal change TC on the basis of a determination result indicating that the state of the luminance indicated by the luminance information of the tracking region TR has become the second state Y. Further, here, the region in which the state determination unit 112 determines that the state of the luminance indicated by the luminance information is the second state Y is referred to as the tracking stop region SR.

The movement state calculation unit 114 calculates a movement state M of the tracking region TR on the basis of a calculation result of the position calculation unit 111 and the determination result of the state determination unit 112. Here, the movement state M includes a mobility of the tracking region TR. The mobility includes, for example, a movement distance which is a distance by which the representative point G of the tracking region TR has moved, a movement speed which is the speed of the representative point G, a movement acceleration which is the acceleration of the representative point G, an average movement speed, and an average movement acceleration.

Thus, the state determination unit 112 determines the state (a first state, a second state, and the like) of the luminance using a magnitude relationship between luminance values in the tracking region TR, and the movement state calculation unit 114 calculates the movement state M of the tracking region TR on the basis of the state of the luminance determined by the state determination unit 112.

The output unit 12 includes the movement state M calculated by the movement state calculation unit 114 in an analysis result A and outputs the result to a presentation unit 3.

The storage unit 13 stores various types of information used for a process by the control unit 11.

Further, the storage unit 13 stores the above-described calculation result, determination result, and/or movement state M for each cell. In this case, the storage unit 13 is a database in which stored cell tracking information (for example, the calculation result of the position calculation unit 111, the determination result of the state determination unit 112, and/or the movement state M of the tracking region TR) is stored and managed.

The presentation unit 3 presents the analysis result A output from the image processing device 1. The presentation unit 3 is, for example, a display.

A cell tracking process of the image processing device 1 will be described herein with reference to FIGS. 2 to 4.

Figure 2:
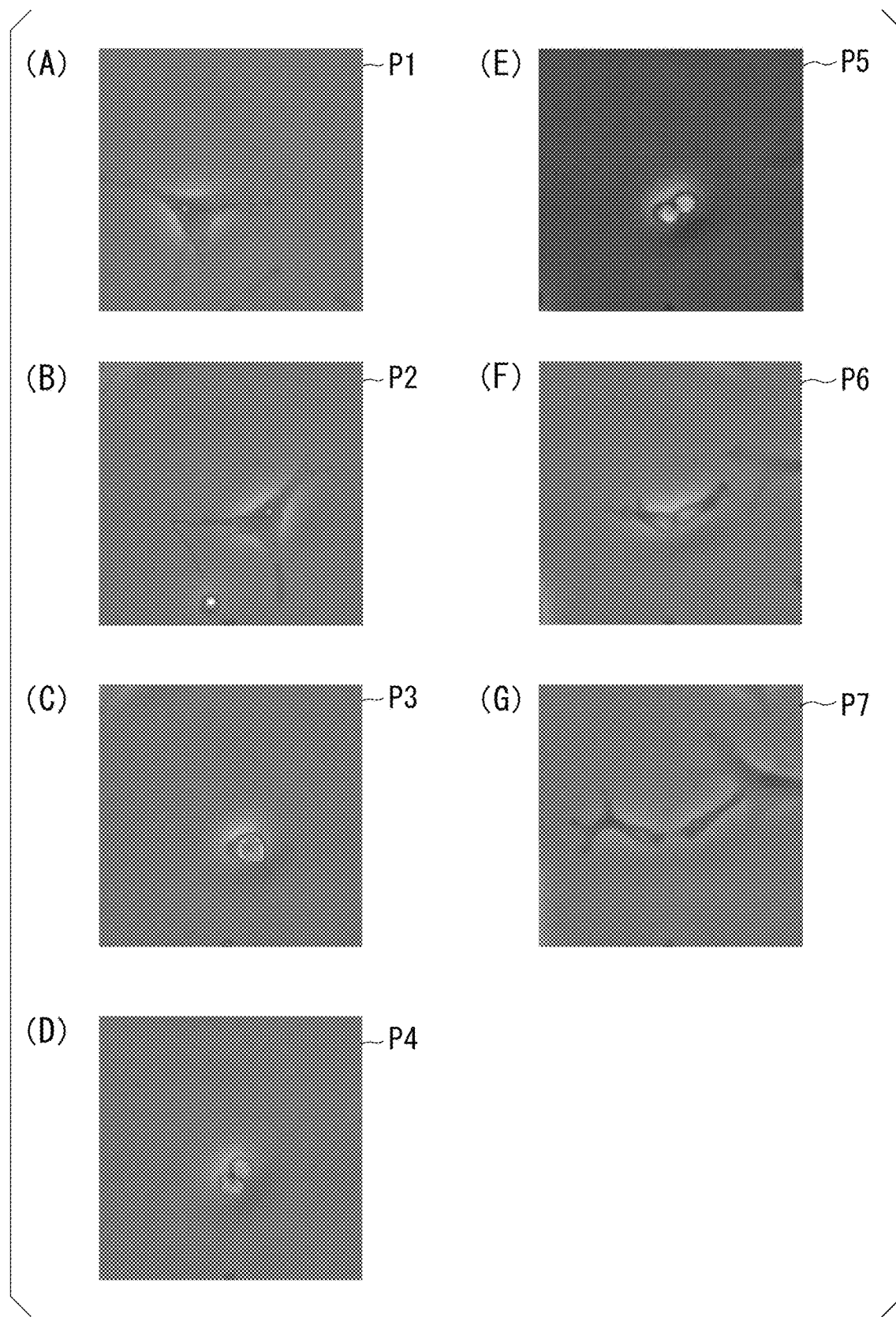
FIG. 2 is a diagram illustrating an example of an image of image analysis according to the first embodiment.

FIG. 2 is a diagram illustrating an example of an image P of image analysis according to the present embodiment. FIG. 3 is an example of image analysis according to the present embodiment and is a figure obtained by schematically drawing the image in FIG. 2 to correspond to each figure (for example, FIG. 2(A)) of FIG. 2 in order to make the image illustrated in FIG. 2 easy to understand. Images P1 to P7 illustrated in FIGS. 2 and 3 are frames at times T1 to T7 of the image P, respectively.

The tracking region extraction unit 110 extracts the tracking region TR1 from the image P1 as the tracking region TR. A luminance value of the tracking region TR1 in the image P1 is smaller than that of the background BG1 (hereinafter also referred to as a background BG) in the image P1 used as a predetermined value (a threshold value), and the luminance of the tracking region TR1 is in the first state X. The position calculation unit 111 calculates a trajectory TC1 on the basis of the plurality of frames of the image P as a temporal change TC in the center of gravity G1 of the tracking region TR1. In FIG. 3(A), the trajectory TC1 is calculated on the basis of the plurality of frames of the image P before the time T1 including the image P1. Thus, the position calculation unit 111 calculates the tracking region TR1 specified by the tracking region extraction unit 110 by using the image P including a plurality of frames (for example, the image P1 and the image before the time T1).

In an image P2 of FIG. 3(B), the tracking region TR1 in the image P1 changes to a tracking region TR2, and the center of gravity G1 moves to a center of gravity G2 accordingly. Further, a trajectory TC2 is calculated by the position calculation unit 111 as the temporal change TC.

In an image P3 of FIG. 3(C), the tracking region TR2 in the image P2 changes to a tracking region TR3. The luminance value of the tracking region TR3 in the image P3 is larger than that of the background BG. In this case, the state determination unit 112 determines that the state of the luminance indicated by the luminance information of the tracking region TR3 is the second state Y. The stop control unit 113 causes the position calculation unit 111 to stop the calculation of the temporal change TC on the basis of a determination result that the state of the luminance indicated by the luminance information of the tracking region TR3 is the second state Y.

Tracking regions TR4 to TR7 in images P4 to P7 of FIGS. 3(D) to 3(G) are changes in the tracking region TR3 of the image P3. Luminance values of the tracking regions TR4 to TR5 are larger than that of the background BG. The tracking regions TR4 to TR5 are imaged as brighter regions as compared with the background BG in dark contrast. Further, luminance values of the tracking regions TR6 to TR7 are smaller than that of the background BG. The tracking regions TR6 to TR7 are imaged as darker regions as compared with the background BG in the dark contrast.

Figure 3:
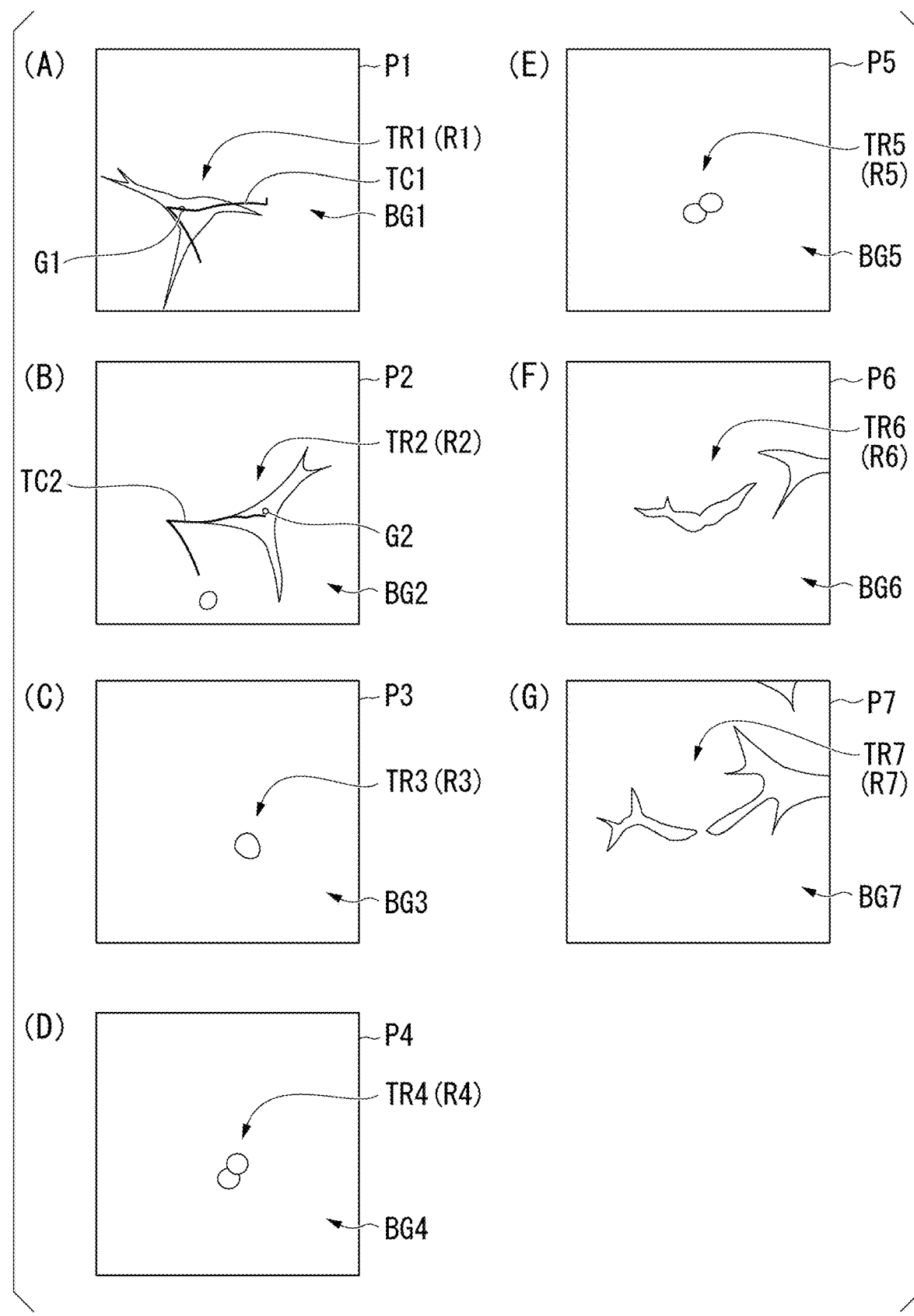
FIG. 3 is a diagram schematically illustrating the image of FIG. 2 in order to make the image illustrated in FIG. 2 easy to understand.
Figure 4:
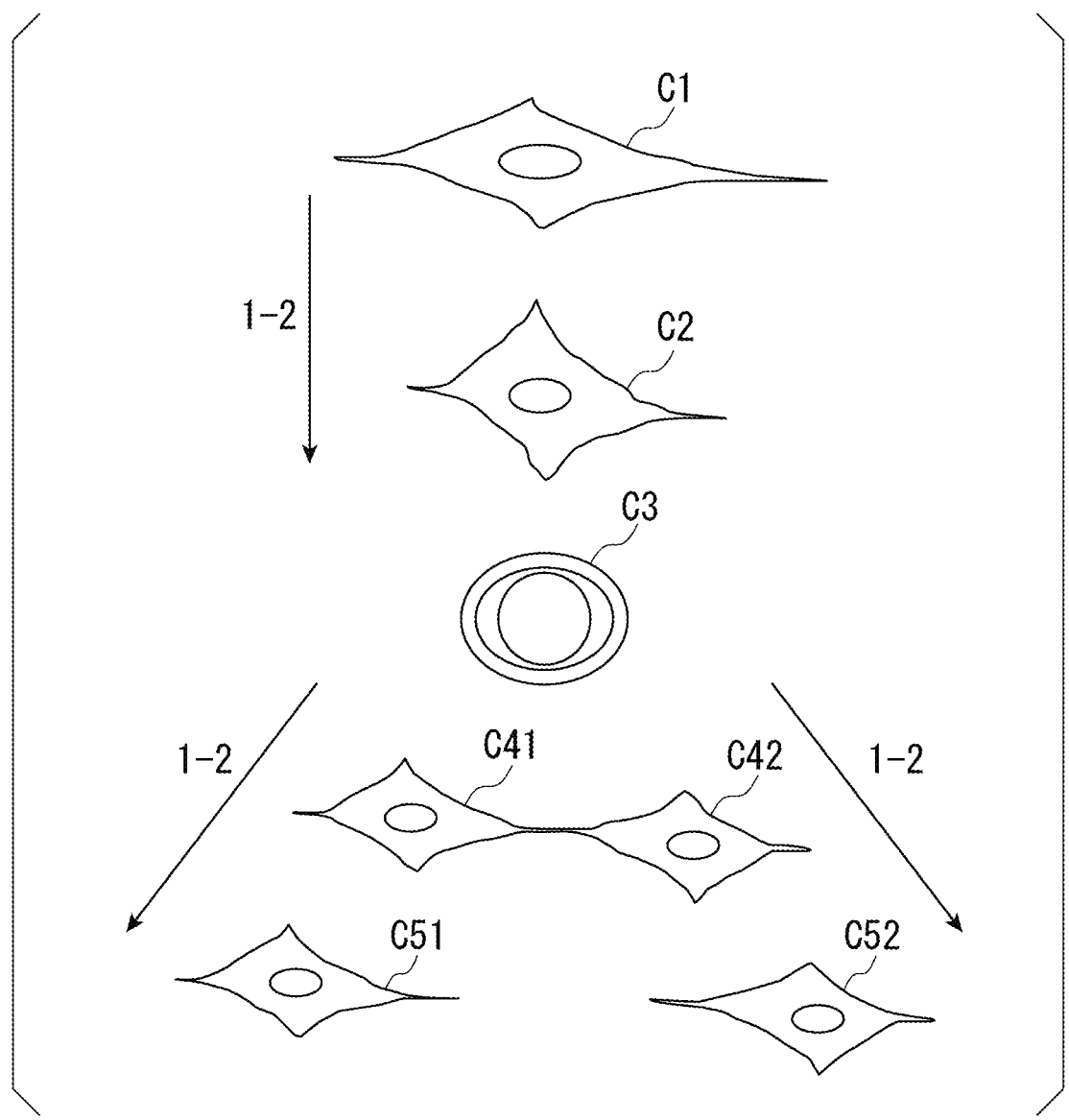
FIG. 4 is a diagram illustrating an example of cell tracking according to the first embodiment.

FIG. 4 is a diagram illustrating an example of a process of tracking the cell C according to the present embodiment. The cells C1 and C2 correspond to, for example, the tracking region TR1 of the image P1 and the tracking region TR2 of the image P2 in FIG. 3, and tracking is performed in a first frame that is an initial frame in which the tracking of the cells C has started and a second frame. A cell C3 corresponds to, for example, the tracking region TR3 of the image P3 in FIG. 3, and is a cell floating immediately before cell division. Here, floating cells appear at the time of the division of the adherent cell. The floating cells are captured as a brighter region as compared with the background BG in the image P. In the cell tracking process according to the present embodiment, cell tracking determined to be floating is stopped.

The cell C41 and the cell C42 correspond to, for example, the tracking region TR6 of the image P6 in FIG. 3, and are cells that have divided from the cell C3. The tracking process of the present embodiment is newly started independently for each of the cell C41 and the cell C42. The cell C41 and the cell C51 are tracked in first and second frames counted after the tracking process is newly started. On the other hand, the cell C42 and the cell C52 are tracked in the first and second frames counted after the tracking process is newly started.

In the cell tracking process according to the present embodiment, cell movement and cell division are distinguished in order to improve the accuracy of analysis of the movement of one cell.

Figure 18:
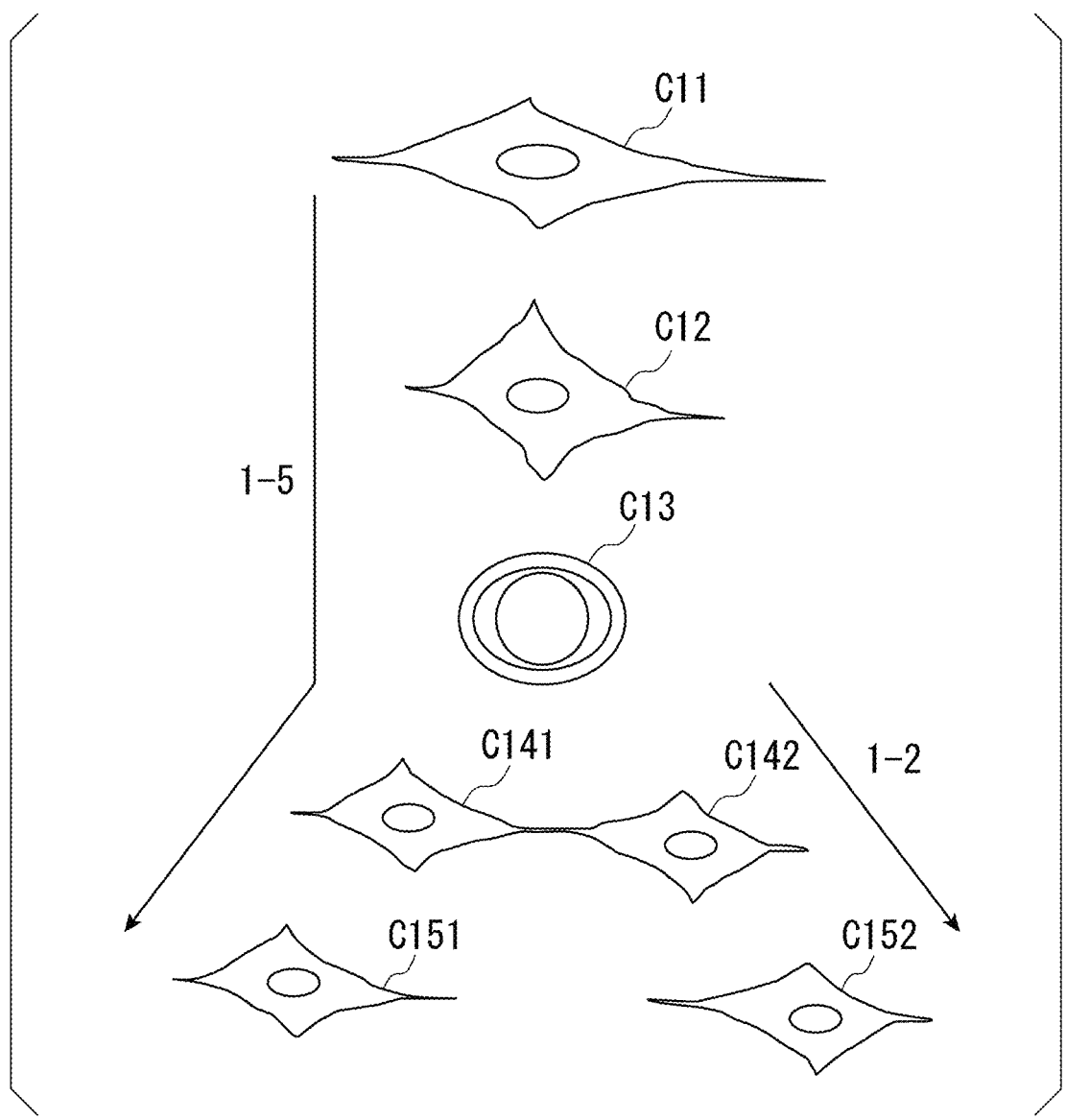
FIG. 18 is a diagram illustrating an example of cell tracking of the related art.

Here, for comparison, a cell tracking process of the related art will be described with reference to FIG. 18. FIG. 18 is a diagram illustrating an example of the cell tracking process of the related art. The cell C11, the cell C12, the cell C13, the cell C141, the cell C151, the cell C142, and the cell C152 are the same cells as the cell C1, the cell C2, the cell C3, the cell C41, the cell C51, the cell C42, and the cell C52 in FIG. 4, respectively.

As illustrated in FIG. 18, in the cell tracking process of the related art, the cell C11, the cell C12, the cell C13, the cell C141, and the cell C151 are tracked in first to fifth frames. In the cell tracking process of the related art, the cell C13, which is a cell floating immediately before division, is continuously tracked without being distinguished from the cell C11 and the cell C12, which are in a cell movement state.

Further, the cells C141 and C151 that are cells after division are continuously tracked from the cells C11, C12, and C13. Further, a tracking process is newly started for the cell C142 and the cell C152, which are cells after division.

As described above, in the cell tracking process of the related art, cell movement and cell division are not distinguished, and tracking is continued even though the cells divide or tracking to be continued is interrupted. Results of the tracking differ from case to case, and the analysis conditions could not be unified.

Figure 5:
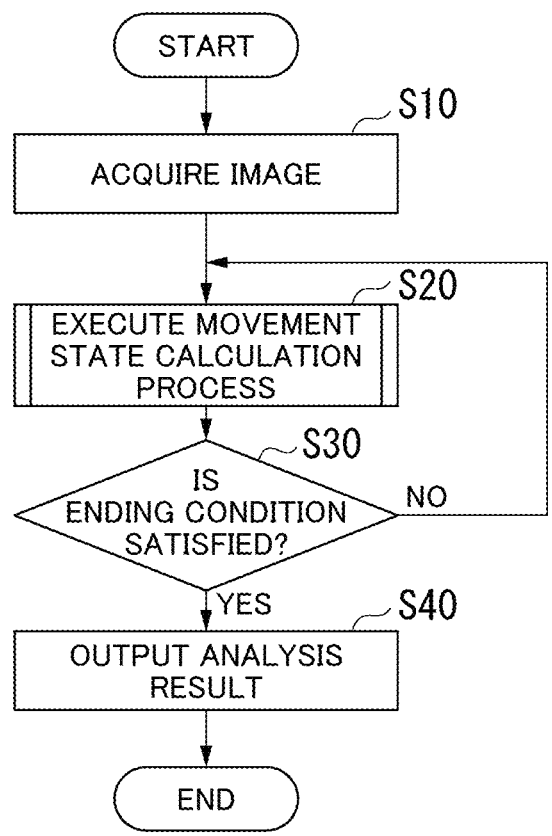
FIG. 5 is a diagram illustrating an example of image processing according to the first embodiment.

Next, image processing of the image processing device 1 will be described with reference to FIGS. 5 and 6. FIG. 5 is a diagram illustrating an example of image processing according to the present embodiment.

Step S10: The image acquisition unit 10 acquires the image P output from the microscope 2. The image acquisition unit 10 supplies the acquired image P to the control unit 11. The image P includes n frames from a first frame to an n-th frame obtained by moving image capturing of a sample (for example, cells) or continuous capturing of still images (for example, time-lapse photography).

Step S20: The control unit 11 executes the movement state calculation process. For example, the movement state calculation process is a process of calculating the movement state M of the cell C captured in the image P.

The movement state calculation process is executed in units of each frame of the image P (for example, the first frame and the second frame). The control unit 11 performs the movement state calculation process on one frame in one movement state calculation process of step S20. In an initial movement state calculation process of step S20, the control unit 11 sets the first frame of the image P as a processing target.

In the following description, a frame which is a processing target in a current movement state calculation process is referred to as an i-th frame. A frame which is a processing target in a movement state calculation process immediately before the current movement state calculation process is referred to as an (i−1)-th frame or the like.

The movement state calculation process will be described herein with reference to FIG. 6. FIG. 6 is a diagram illustrating an example of the movement state calculation process according to the present embodiment. Steps S110 to S160 of FIG. 6 are executed as step S20 of FIG. 5.

Step S110: The tracking region extraction unit 110 extracts the region R that is in a state which the luminance value is smaller than that of the background BG of the image P as the tracking region TR from the image P. For example, the tracking region extraction unit 110 extracts the tracking region TR of which the state of the luminance indicated by the luminance information is the first state X from the image P.

Further, the tracking region extraction unit 110 extracts a region in a state in which a luminance value is larger than that of the background BG of the image P (the second state Y) as the tracking stop region SR from the image P. Here, the tracking region extraction unit 110 extracts one tracking region TR and one tracking stop region SR. The tracking region extraction unit 110 may extract a plurality of tracking regions TR and a plurality of tracking stop regions SR on the basis of the above-described luminance value.

When neither the region R that is in a state in which the luminance value is larger than that of the background BG nor the region R that is in a state in which the luminance value is smaller than that of the background BG are present in the image P, the tracking region extraction unit 110 may not extract any region from the image P.

Since the image P is a phase contrast image captured in dark contrast, the tracking region TR is a region having a lower luminance than the background BG, and the tracking stop region SR is a region having a higher luminance than the background BG.

Step S120: The position calculation unit 111 extracts the center of gravity G1 of the tracking region TR as the representative point G of the tracking region TR extracted by the tracking region extraction unit 110. When there are a plurality of tracking regions TR, the position calculation unit 111 extracts the center of gravity G1 for each of the plurality of tracking regions TR. The position calculation unit 111 stores center of gravity position information GI1, which is information indicating a position of the extracted center of gravity G1, in the storage unit 13.

The position calculation unit 111 may extract a point selected from the tracking region TR on the basis of a predetermined reference as the representative point G instead of the center of gravity G1 as the representative point G. The predetermined reference is, for example, that the luminance value of the tracking region TR is larger or smaller than a predetermined value. Further, the position calculation unit 111 may extract any one point in a region inside the tracking region TR as the representative point G on the basis of a predetermined position, an input instruction from a user, or the like.

Step S130: The position calculation unit 111 calculates the temporal change TC in the center of gravity G1 of the tracking region TR extracted in step S120 on the basis of the plurality of frames of the image P. The position calculation unit 111 calculates a trajectory TC1 of the center of gravity G1 as an example of the temporal change TC in the center of gravity G1. When there are a plurality of tracking regions TR, the position calculation unit 111 calculates the temporal change TC in the center of gravity G1 for each of the plurality of tracking regions TR on the basis of the plurality of frames of the image P.

Here, the center of gravity G1 extracted in a current i-th frame is referred to as a center of gravity G1$i$, and the center of gravity G1 extracted in an (i–1)-th frame is referred to as the center of gravity G1$i$–1. The position calculation unit 111 connects the center of gravity G1$i$ to the center of gravity G1$i$–1 with a straight line or a curved line to calculate the trajectory TC1 of the center of gravity G1.

That is, the position calculation unit 111 calculates the center of gravity G1 of the tracking region TR extracted by the tracking region extraction unit 110 for each of a plurality of frames of the image P to calculate the trajectory TC1.

When a plurality of tracking regions TR are extracted in step S110, the position calculation unit 111 associates a plurality of tracking regions TRi extracted in the current i-th frame with the plurality of tracking region TRi–1 extracted in the (i–1)-th frame. Hereinafter, this association process is referred to as a region association process.

For example, the position calculation unit 111 associates a tracking region TRi–1,k which is a k-th tracking region TR among the plurality of tracking regions TRi–1 extracted in the (i–1)-th frame with a tracking region TRi,j which is a j-th tracking region TR among the plurality of tracking regions TRi extracted in the i-th frame through the region association process.

Here, for the region association process, an image processing technology for associating a plurality of regions in a frame between different frames is used. In the region association process, as an example, the tracking regions TR located closest to each other between different frames (for example, regions having a small distance between tracking regions TR) are associated with each other.

The position calculation unit 111 selects the region corresponding to the tracking regions TRi–1,k extracted in the (i–1)-th frame from among the tracking regions TRi extracted in the i-th frame. The position calculation unit 111 executes this selection process for all of the tracking regions TRi–1 extracted in the (i–1)-th frame.

When the number of plurality of tracking regions TRi extracted in the i-th frame is larger than the number of plurality of tracking regions TRi–1 extracted in the (i–1)-th frame, there is a tracking region TRi that cannot be associated with any one of the plurality of tracking regions TRi–1 extracted in the (i–1)-th frame among the plurality of tracking regions TRi. The tracking region TRi not associated with any one of the plurality of tracking regions TRi–1 is referred to as a tracking region TRi,u. The position calculation unit 111 sets a starting point of a trajectory TC1 of the tracking region TRi,u as the center of gravity G1 of the tracking region TRi,u.

The position of the tracking region TR, for example, is used to calculate the distance between the tracking regions TR. In the region association process, the center of gravity G1 calculated in step S120, for example, is used for the position of the tracking region TR.

Here, before a process of step S130 starts, the position calculation unit 111 reads the center of gravity position information GI1 from the storage unit 13 and performs a process of calculating the above-described trajectory TC1 on the basis of the read center of gravity position information GI1. Further, the position calculation unit 111 stores the calculated trajectory TC1 in the storage unit 13.

Step S140: The state determination unit 112 determines that the luminance value of the tracking region TR extracted by the tracking region extraction unit 110 is larger than that of the background BG of the image P. When there are a plurality of tracking regions TR, the state determination unit 112 determines that the luminance value of the tracking region TR extracted by the tracking region extraction unit 110 is larger than that of the background BG of the image P for each of the plurality of tracking regions TR.

Here, the tracking region TR extracted in the current i-th frame is defined as a tracking region TRi. The tracking stop region SR extracted in the current i-th frame is defined as a tracking stop region SRi. The tracking region TR extracted in the (i–1)-th frame is defined as a tracking region TRi–1. The tracking stop region SR extracted in the (i–1)-th frame is defined as a tracking stop region SRi–1.

The state determination unit 112 associates the tracking stop region SRi extracted in the i-th frame with the tracking region TRi–1 or the tracking stop region SRi–1 extracted in the (i–1)-th frame through the region association process described above. Here, the state determination unit 112 associates the tracking stop region SRi with the tracking region TRi–1 or the tracking stop region SRi–1 on the basis of the calculated trajectory TC1.

The state determination unit 112 associates the tracking stop region SRi with the tracking region TRi–1 or the tracking stop region SRi–1, for example, when a position of the center of gravity G1$i$ of the tracking stop region SRi and a position of the center of gravity G1$i$–1 of the tracking region TRi–1 or the tracking stop region SRi–1 are included in the same trajectory TC1. The associated regions correspond to the same cell.

The state determination unit 112 causes the position calculation unit 111 to calculate the center of gravity G1 of the tracking stop region SR in step S140.

When the state determination unit 112 associates the tracking region TRi−1 in the (i−1)-th frame with the tracking stop region SRi in the i-th frame, the state determination unit 112 determines that the tracking region TRi−1 has changed to the tracking stop region SRi. That is, the state determination unit 112 determines that the luminance value of the tracking region TRi−1 in the (i−1)-th frame has changed, in the i-th frame, to a state in which the luminance value is larger than the luminance value of the background BG of the image P.

Step S150: The stop control unit 113 causes the position calculation unit 111 to stop the calculation of the temporal change TC on the basis of the determination result of the state determination unit 112, to end the tracking of the cells C that is being tracked. That is, the position calculation unit 111 stops the calculation of the temporal change TC for the tracking region TR that is in a state in which the state of the luminance indicated by the luminance information is larger than that of the background BG of the image P.

The stop control unit 113 may cause the position calculation unit 111 to stop the calculation of the temporal change TC on the basis of a result of combining the determination result of the state determination unit 112 and any one or more of the following auxiliary conditions.

The first auxiliary condition is, for example, that an area of the tracking region TR is equal to or smaller than a predetermined value. The second auxiliary condition is, for example, that a distance in the image P between the tracking region TRi in the i-th frame and the tracking region TRi−1 in the (i−1)-th frame is equal to or greater than a predetermined value. The third auxiliary condition is, for example, that the number of frames used to calculate the trajectory TC1 is equal to or smaller than a predetermined value. In the third auxiliary condition, the predetermined value for the number of frames is, for example, two frames.

Step S160: The movement state calculation unit 114 calculates the movement state M of the tracking region TR on the basis of the calculation result of the position calculation unit 111. Here, since the calculation result of the position calculation unit 111 is a result until the calculation of the temporal change TC is stopped by the stop control unit 113 on the basis of the determination result of the state determination unit 112, the calculation result is based on the determination result of the state determination unit 112.

The movement state calculation unit 114 calculates, for example, a movement distance of the center of gravity G1 and a movement speed of the center of gravity G1 as the movement state M. The movement state calculation unit 114 supplies the calculated movement state M to the output unit 12.

The control unit 11 then ends the movement state calculation process of the tracking region TR including the cell C.

Next, description of the image processing of the image processing device 1 will be continued by referring back to FIG. 5.

Step S30: The control unit 11 determines whether or not an ending condition is satisfied. Here, the ending condition is a condition for ending repetition of the movement state calculation process in step S20. The ending condition is, for example, that the movement state calculation process is executed for a predetermined number of frames of the image P. The predetermined number is, for example, the number (n) of all frames constituting the image P. The predetermined number may be a number smaller than the number of all the frames constituting the image P.

When the control unit 11 determines that the ending condition is satisfied (step S30; YES), the control unit 11 executes a process of step S40. On the other hand, when the control unit 11 determines that the ending condition is not satisfied (step S30; NO), the control unit 11 changes a frame that is a target of the movement state calculation process among the frames of the image P from a current frame to the next frame. For example, when the i-th frame is a processing target in an immediately preceding movement state calculation process, the control unit 11 changes a target of the next process to an (i+1)-th frame. Thereafter, the control unit 11 returns to step S20 and executes the movement state calculation process again.

Step S40: The output unit 12 outputs the analysis result A including at least one of the movement distance which is a distance by which the representative point G of the tracking region TR has moved, the movement speed which is the speed of the representative point G, the movement acceleration which is the acceleration of the representative point G, the average movement speed, and the average movement acceleration to the presentation unit 3. Here, the output unit 12 includes the movement state M calculated by the movement state calculation unit 114 in the analysis result A and outputs a resultant analysis result A to the presentation unit 3.

The image processing device 1 then ends the image processing (movement state calculation process).

As described above, when the ending condition is not satisfied in step S30, the control unit 11 executes a process of extracting the tracking region TR in step S110 and a process of calculating the temporal change TC in step S130 again to return to step S20 and execute the movement state calculation process again.

That is, the tracking region extraction unit 110 extracts the tracking region TR, which is the first state X, from the plurality of frames of the image P again after the stop control unit 113 causes the position calculation unit 111 to stop calculation of the temporal change TC. The position calculation unit 111 calculates the temporal change TC in the position of the tracking region TR extracted again by the tracking region extraction unit 110 on the basis of a plurality of images P after the stop control unit 113 causes the position calculation unit 111 to stop calculation of the temporal change TC.

Figure 6:
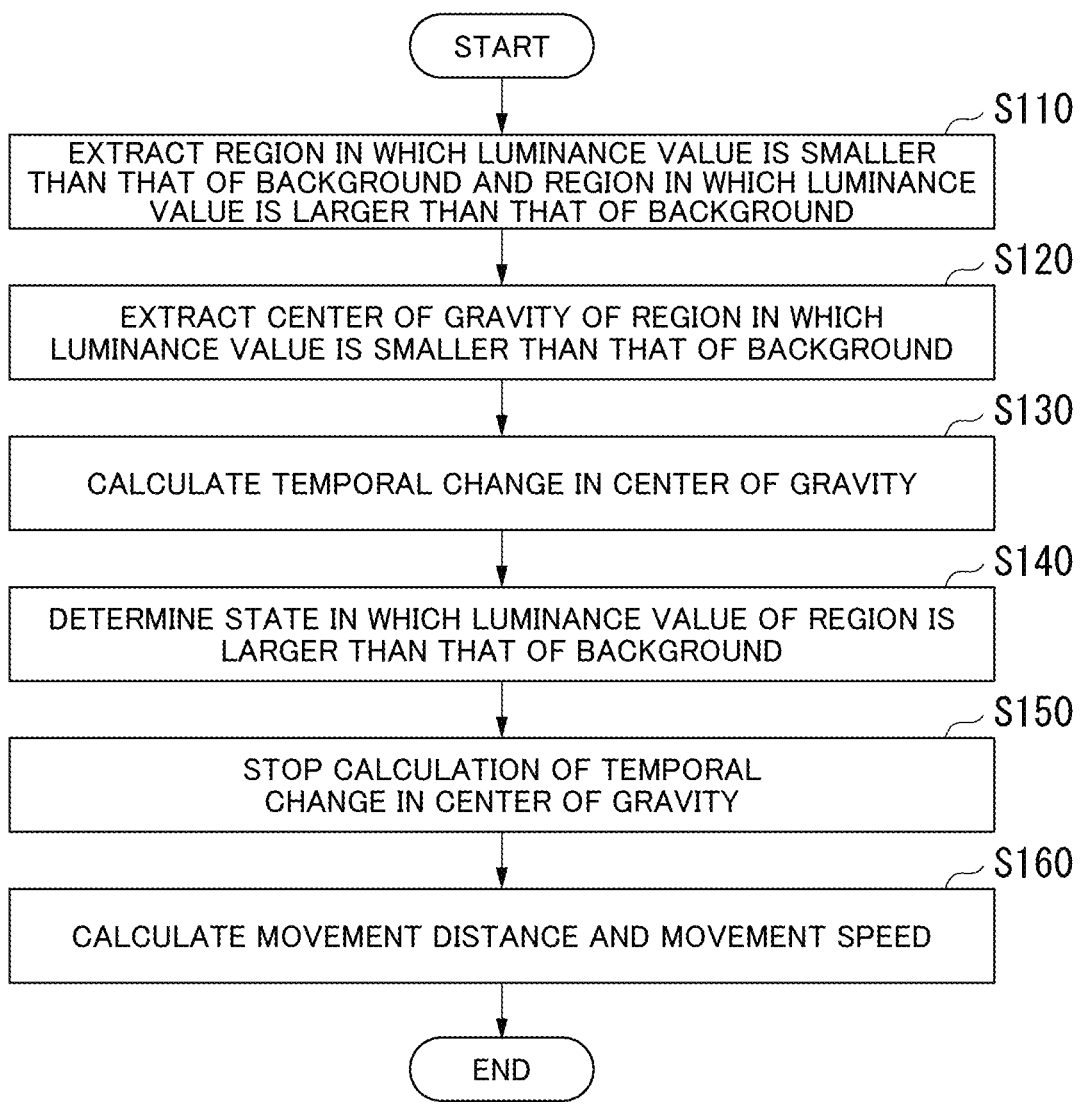
FIG. 6 is a diagram illustrating an example of a movement state calculation process according to the first embodiment.

In the movement state calculation process of FIG. 6, since the position calculation unit 111 stops the calculation of the temporal change TC for the tracking region TR that is in a state in which the state of the luminance indicated by the luminance information is larger than that of the background BG of the image P, the center of gravity G1 of the tracking region TR that is in a state in which the state of luminance indicated by the luminance information is larger than that of the background BG of the image P is excluded from the temporal change TC calculated by the position calculation unit 111.

That is, the position calculation unit 111 excludes the center of gravity G1 when the state of the luminance indicated by the luminance information of the tracking region TR is the second state Y to calculate the temporal change TC. In the image processing device 1 according to the present embodiment, since a period of a state in which the cell C is not moving can be excluded through the movement state calculation process in the analysis of the movement state M of the cell C, it is possible to improve the analysis accuracy of the movement state M of the cell C as compared with a case in which the period of the state in which the cell C is not moving is not excluded. Here, the state in which the cell C does not move includes a state in which the cell C is floating immediately before cell division.

Figure 7:
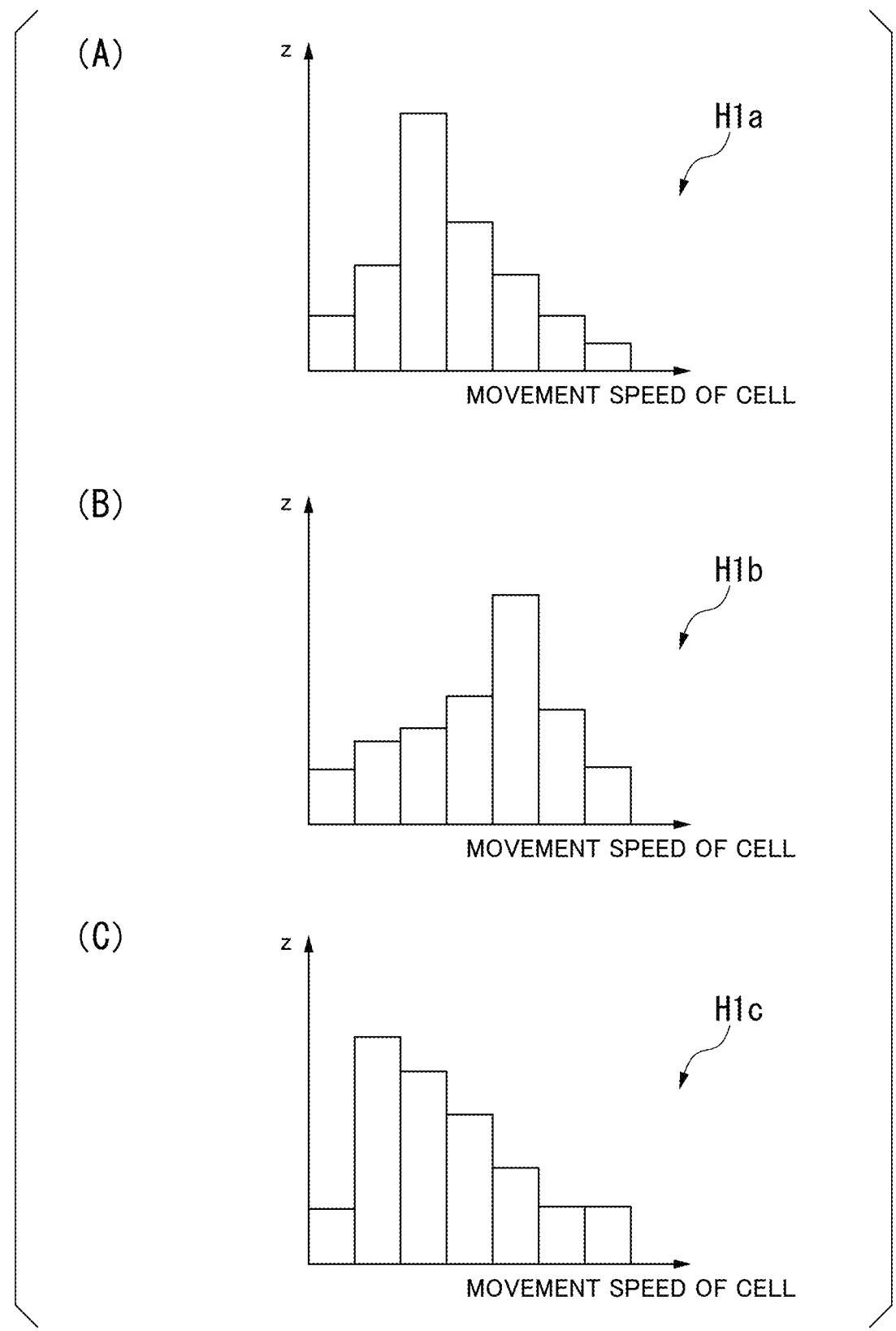
FIG. 7 is a diagram illustrating an example of a histogram of a cell movement speed according to the first embodiment.
Figure 8:
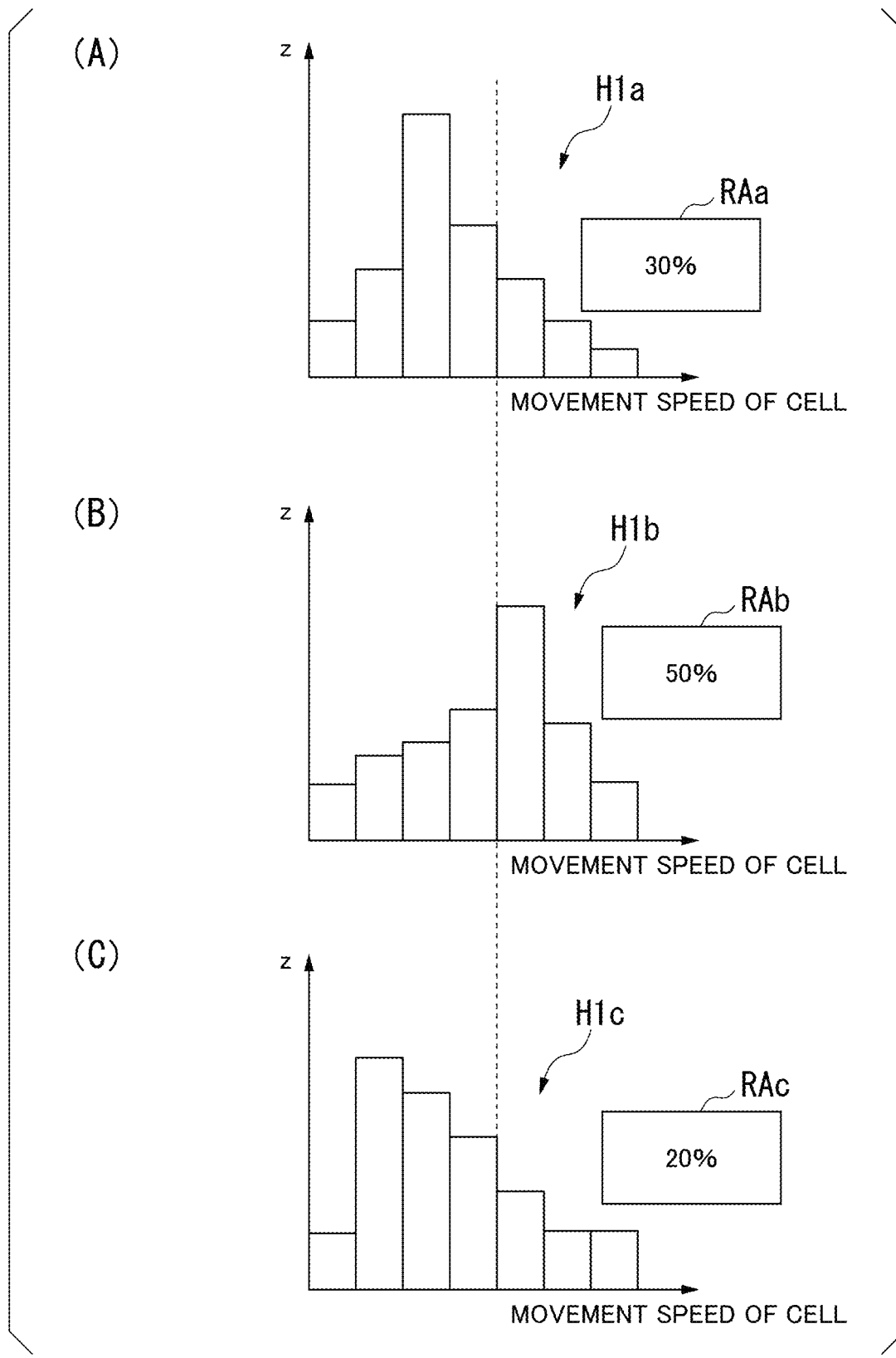
FIG. 8 is a diagram illustrating an example of an evaluation result of a proportion of cells having a high movement speed according to the first embodiment.
Figure 9:
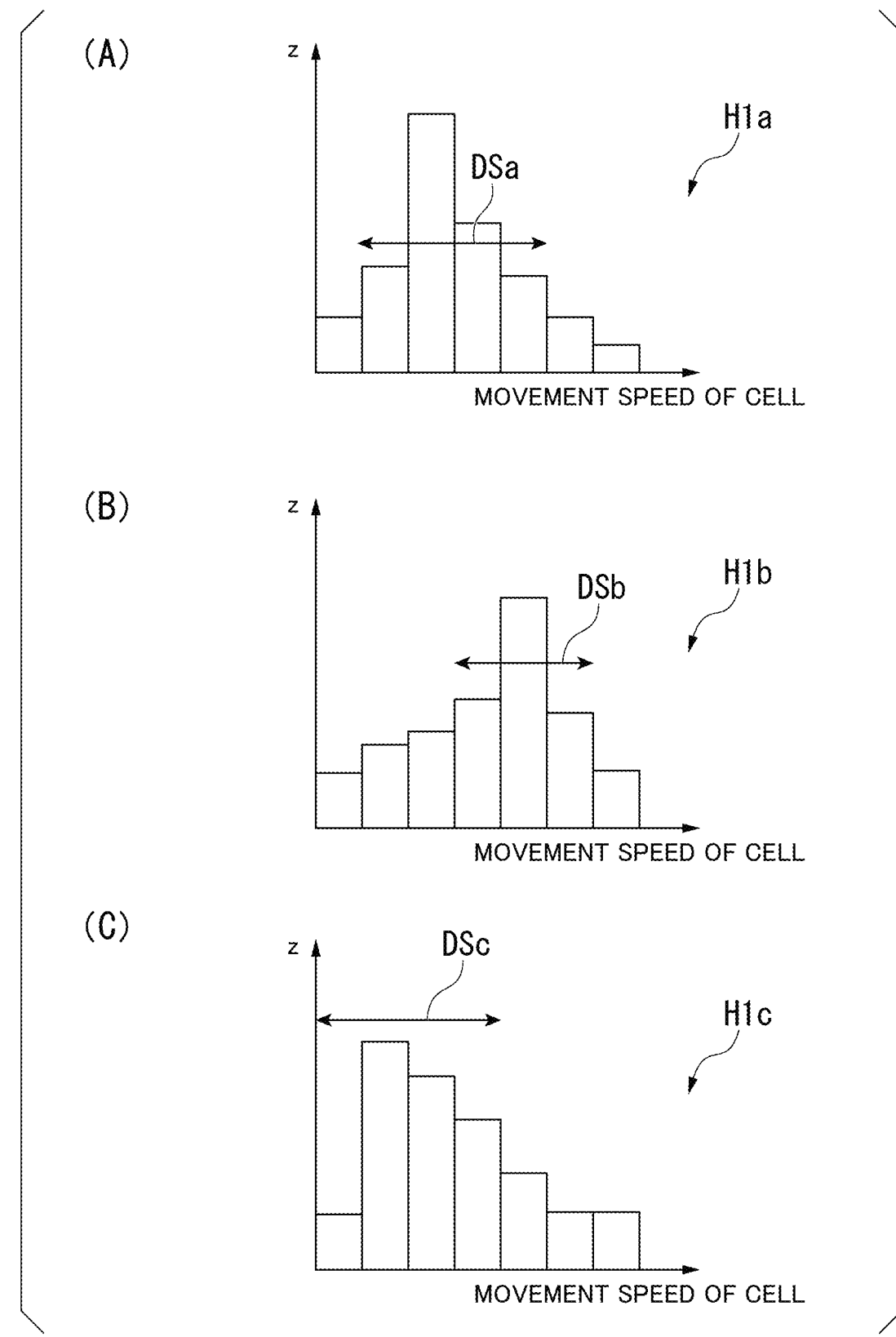
FIG. 9 is a diagram illustrating an example of an evaluation result of variation in a cell movement speed according to the first embodiment.

The analysis result A in a case in which movement speeds of the plurality of cells C captured in the image P are analyzed by using the image processing of the image processing device 1 described above will be described herein with reference to FIGS. 7 to 9. In FIGS. 7 to 9, as an example of the analysis result A, an influence of a cultivation environment such as a coating agent or a nutritional factor contained in a cultivation medium on a migration ability is evaluated by using an index regarding migration ability of the cell C.

FIG. 7 is a diagram illustrating an example of a histogram of the movement speed of the cell C according to the present embodiment. In FIG. 7, distributions of the movement speed for the plurality of cells C are shown as a histogram H1$a$, a histogram H1$b$, and a histogram H1$c$, as the analysis result A. In this histogram, the number Z of plurality of cells C is shown for each movement speed.

FIG. 7(A) illustrates the histogram H1$a$ of the movement speeds of a plurality of cells C under a reference cultivation condition. FIG. 7(B) illustrates the histogram H1$b$ of the movement speeds of the plurality of cells C cultured under a first cultivation condition changed from the reference cultivation condition. FIG. 7(C) illustrates the histogram H1$c$ of the movement speeds of the plurality of cells C cultured under a second cultivation condition changed from the reference cultivation condition.

FIG. 8 is a diagram illustrating an example of an evaluation result of a proportion of cells C having a high movement speed according to the present embodiment. In FIG. 8, proportions of cells C having a movement speed greater than a predetermined value (for example, a threshold value serving as an evaluation index) for the histogram H1$a$, the histogram H1$b$, and the histogram H1$c$ in FIG. 7 are shown as a proportion RAa, a proportion RAb, and a proportion RAc as the analysis result A.

FIG. 9 is a diagram illustrating an example of an evaluation result of a variation in the movement speed of the cell C according to the present embodiment. In FIG. 9, a variation DSa, a variation DSb, and a variation DSc of the movement speed are shown for the histogram H1$a$, the histogram H1$b$, and the histogram H1$c$ in FIG. 7 as the analysis result A.

In the present embodiment, an example in which the microscope 2 captures the image P, which is a phase contrast image, in dark contrast has been described, but the present invention is not limited thereto. The microscope 2 may capture the image P in bright contrast. When the image P is captured in the bright contrast, for example, the first state X is a state in which the luminance value is larger than a predetermined value, and the second state Y is a state in which the luminance value is smaller than the predetermined value.

In the present embodiment, an example in which one type of predetermined value (for example, the luminance value of the background BG) is used to determine the first state X and the second state Y has been described, but the present invention is not limited thereto. Two types of predetermined values may be used to determine the first state X and the second state Y.

When two types of predetermined values are used, the first state X is, for example, a state in which the luminance value is smaller than a first predetermined value, and the second state Y is, for example, a state in which the luminance value is larger than a second predetermined value in an example of the dark contrast. Here, the first predetermined value is smaller than the second predetermined value. The first predetermined value is, for example, the luminance value of the background BG. The second predetermined value is, for example, a luminance value preset by a user or the like or a luminance value preset on the basis of a prior experimental result or the like.

When two types of predetermined values are used and the luminance value of the region R is an intermediate value between the first predetermined value and the second predetermined value, the region R is not determined to be in either the first state X or the second state Y or is determined to be in the first state X, for example.

In the present embodiment, an example of the case in which the average value of the luminance values acquired from the entire background BG of the first frame of the image P is commonly used for all frames included in the image P as a predetermined value of the luminance value in a case in which the first state X or the second state Y is determined has been described, but the present invention is not limited thereto.

As described above, the luminance value acquired from the specific portion of the background BG may be used as the predetermined value commonly used for all the frames included in the image P. Further, a luminance value acquired from a background BG of a frame other than the first frame of the image P (for example, an i-th frame other than the first frame or a last frame) may be used as the predetermined value commonly used for all the frames included in the image P. An average value of luminance values acquired from backgrounds BG of one or more frames included in the image P may be commonly used for all the frames included in the image P as the predetermined value commonly used for all the frames included in the image P.

Further, the predetermined value commonly used for all the frames included in the image P may be a value preset by the user or the like. The preset value may be set without the image P, or may be set on the basis of prior experimental results or the like.

Further, the predetermined value may be different for each frame included in the image P. For example, for the predetermined value different for each frame included in the image P, a luminance value acquired from the background BG of each frame of the image P may be used for each frame. Further, for example, for the predetermined value different for each frame included in the image P, a plurality of preset values may be used for each frame.

As described above, the image processing device 1 according to the present embodiment includes the region extraction unit (the tracking region extraction unit 110 in this example), the position calculation unit 111, the state determination unit 112, and the movement state calculation unit 114.

The region extraction unit (the tracking region extraction unit 110 in this example) extracts the tracking region TR in which the state of luminance (the luminance value in this example) indicated by the luminance information is the first state X (a state in which the luminance value is smaller than that of the background BG of the image P in the dark contrast in this example) from a plurality of images (a plurality of frames of the image P in this example) in which cells C are detected at a plurality of times.

The position calculation unit 111 calculates the temporal change TC in the position of the tracking region TR extracted by the region extraction unit (the tracking region extraction unit 110 in this example) based on the plurality of images (the plurality of frames of the image P in this example).

The state determination unit 112 determines that the state of the luminance (the luminance value in this example) indicated by the luminance information of the tracking region TR extracted by the region extraction unit (the tracking region extraction unit 110 in this example) is the second state Y (a state in which the luminance value is larger than that of the background BG of the image P in the dark contrast in this example) different from the first state X (the state in which the luminance value is smaller than that of the background BG of the image P in the dark contrast in this example).

The movement state calculation unit 114 calculates the movement state M (the movement speed in this example) of the tracking region TR on the basis of the calculation result of the position calculation unit 111 and the determination result of the state determination unit 112. Here, the calculation result of the position calculation unit 111 includes, for example, the result of calculating the temporal change TC in the center of gravity G1 of the tracking region TR. Further, the determination result of the state determination unit 112 includes, for example, the result of determining that the luminance value of the tracking region TR is larger than that of the background BG.

With this configuration, since the image processing device 1 according to the present embodiment tracks a single cell using a determination result of whether or not the single cell is floating immediately before cell division so that the accuracy of the tracking of the cell can be improved, it is possible to improve the analysis accuracy of the movement state M of the cell as compared with a case in which the determination result of whether or not the cell is floating immediately before cell division is not used.

Further, in the image processing device 1 according to the present embodiment, the position calculation unit 111 calculates the position of the tracking region TR (the center of gravity G1 in this example) extracted by the region extraction unit (the tracking region extraction unit 110 in this example) for each of the plurality of images (the plurality of frames of the image P in this example) to calculate the temporal change TC.

With this configuration, since the image processing device 1 according to the present embodiment can execute the analysis of the movement state M of the cell on the basis of the temporal change TC, it is possible to improve the analysis accuracy of the movement state M of the cell as compared with a case in which the temporal change TC is not used.

Further, in the image processing device 1 according to the present embodiment, the position calculation unit 111 excludes the position of the tracking region TR (the center of gravity G1 in this example) when the state of the luminance (the luminance value in this example) indicated by the luminance information of the tracking region TR is the second state Y (a state in which the luminance value is larger than that of the background BG of the image P in the dark contrast in this example) to calculate the temporal change TC.

With this configuration, since the image processing device 1 according to the present embodiment can exclude cells floating immediately before cell division from an analysis target of the movement state M and perform tracking, it is possible to improve the analysis accuracy of the movement state M of the cell as compared with a case in which the cells floating immediately before cell division are not excluded.

When a cell divides, the center of gravity of the cell moves instantly. Therefore, when tracking is performed on cells at the time of cell division in migration ability analysis using the tracking process, an average speed may be over-estimated and noise for an analysis result of the migration ability analysis may be caused. Further, as described above, in the cell tracking process of the related art, the analysis conditions cannot be unified, and numerical values of results of the migration ability analysis may vary.

In the image processing device 1 according to the present embodiment, since the noise for the analysis result of the migration ability analysis can be removed by distinguishing the cell movement distance from the division in the tracking process, it is possible to improve the analysis accuracy of the movement state M of the cell.

Further, in the image processing device 1 according to the present embodiment, the movement state M includes the mobility of the tracking region TR.

With this configuration, in the image processing device 1 according to the present embodiment, since the mobility of the tracking region TR can be calculated, it is possible to improve the analysis accuracy of mobility of cells as compared with a case in which the determination result of whether or not the cells are floating immediately before cell division is not used.

Further, in the image processing device 1 according to the present embodiment, the movement state M includes the mobility of the tracking region TR (the movement speed in this example).

With this configuration, in the image processing device 1 according to the present embodiment, since it is possible to improve the accuracy of tracking of a plurality of cells captured in the image P, it is possible to improve the analysis accuracy of the movement state M of the plurality of cells as compared with a case in which the determination result of whether or not the cells are floating immediately before cell division is not used.

Further, for example, in the image processing device 1 according to the present embodiment, when the observation scheme (for example, a phase contrast observation scheme or a differential interference observation scheme) is the phase contrast observation scheme and an observation condition is that of dark contrast, the first state X is a state in which the luminance (the luminance value in this example) indicated by the luminance information is smaller than a predetermined value (the luminance value of the background BG in this example), and the second state Y is a state in which the luminance (luminance value in this example) indicated by the luminance information is larger than the predetermined value (the luminance value of the background BG in this example). For example, when the observation scheme is the phase contrast observation scheme and the observation condition is that of bright contrast, the first state X is a state in which the luminance (the luminance value in this example) indicated by the luminance information is larger than the predetermined value (the luminance value of the background BG in this example) and the second state Y is a state in which the luminance (the luminance value in this example) indicated by the luminance information is smaller than the predetermined value (the luminance value of the background BG in this example).

With this configuration, in the image processing device 1 according to the present embodiment, since cell tracking can be performed on the basis of the magnitude of the luminance (the luminance value in this example) indicated by the luminance information and the predetermined value (the luminance value of the background BG in this example), it is possible to improve the analysis accuracy of the cell movement state M as compared with a case in which cell tracking is not performed on the basis of the magnitude of the luminance (the luminance value in this example) indicated by the luminance information and the predetermined value (the luminance value of the background BG in this example).

Further, in the image processing device 1 according to the present embodiment, the predetermined value includes the luminance (the luminance value in this example) indicated by the luminance information of the background BG of the image P.

With this configuration, in the image processing device 1 according to the present embodiment, it is not necessary to set a predetermined value in execution of the image processing described above. When the above-described image processing is executed by using the plurality of image processing devices 1, it is not necessary to set a predetermined value for each of the plurality of image processing devices 1, such that versatility is improved, for example, in a case in which the analysis result A is shared or integrated among the plurality of image processing devices 1.

Further, in the image processing device 1 according to the present embodiment, the position calculation unit 111 calculates the position of the tracking region TR on the basis of the representative point G of the tracking region TR.

With this configuration, since the image processing device 1 according to the present embodiment can execute cell tracking on the basis of the representative point G of the tracking region TR, it is possible to improve the analysis accuracy of the movement state M of the cell as compared with a case in which the representative point G is not used. When cell tracking is performed without being on the basis of the representative point G of the tracking region TR, for example, it is conceivable to select an appropriate point of the tracking region TR for each frame and calculate the trajectory on the basis of the selected point. In this case, the calculated trajectory is likely to be bent more finely than an actual cell trajectory.

Further, in the image processing device 1 according to the present embodiment, the representative point G is the center of gravity G1 of the tracking region TR.

With this configuration, since the image processing device 1 according to the present embodiment can execute the tracking process on the basis of the center of gravity of the cell, it is possible to perform analysis of the movement state M of the cells on the basis of the center of gravity of the cells.

Further, the image processing device 1 according to the present embodiment includes a region extraction unit (in this example, a tracking region extraction unit 110), a position calculation unit 111, a state determination unit 112, and a stop control unit 113. The stop control unit 113 causes the position calculation unit 111 to stop the calculation of the temporal change TC on the basis of the determination result of the state determination unit 112.

With this configuration, since the image processing device 1 according to the present embodiment can stop tracking of dividing cells on the basis of a determination result of whether or not the state of the luminance (the luminance value in this example) indicated by the luminance information of the tracking region TR is the second state Y (a state in which the luminance value is larger than that of the background BG of the image P in the dark contrast in this example), it is possible to improve the analysis accuracy of the cell movement state M as compared with a case in which the tracking of the dividing cells is not stopped.

Further, in the image processing device 1 according to the present embodiment, the region extraction unit (in this example, the tracking region extraction unit 110) extracts the tracking region TR, which is the first state X (the state in which the luminance value is smaller than that of the background BG of the image P in the dark contrast in this example) from the plurality of images (the plurality of frames of the image P in this example) again after the stop control unit 113 causes the position calculation unit 111 to stop calculation of the temporal change TC. The position calculation unit 111 calculates the temporal change TC in the position of the tracking region TR extracted again by the region extraction unit (in this example, the tracking region extraction unit 110) on the basis of the plurality of images (the plurality of frames of the image P in this example) after the stop control unit 113 causes the position calculation unit 111 to stop calculation of the temporal change TC.

With this configuration, since the image processing device 1 according to the present embodiment can restart the tracking process for cells of which tracking has been stopped, it is possible to improve the analysis accuracy of the movement state M of the cell as compared with a case in which the tracking process is not restarted. Further, the image processing device 1 according to the present embodiment using the above-described image processing can start tracking of new cells after division by extracting the tracking region TR that is in the first state X after cell division again.

Second Embodiment

Hereinafter, a second embodiment will be described in detail with reference to the drawings.

In the first embodiment described above, a case in which the image processing device calculates a movement state of a tracking region that is in the first state has been described. In the present embodiment, a case in which the image processing device measures the time when a state of luminance indicated by luminance information of the tracking region is the second state will be described.

The image processing device according to the present embodiment is referred to as an image processing device 1a.

Figure 10:
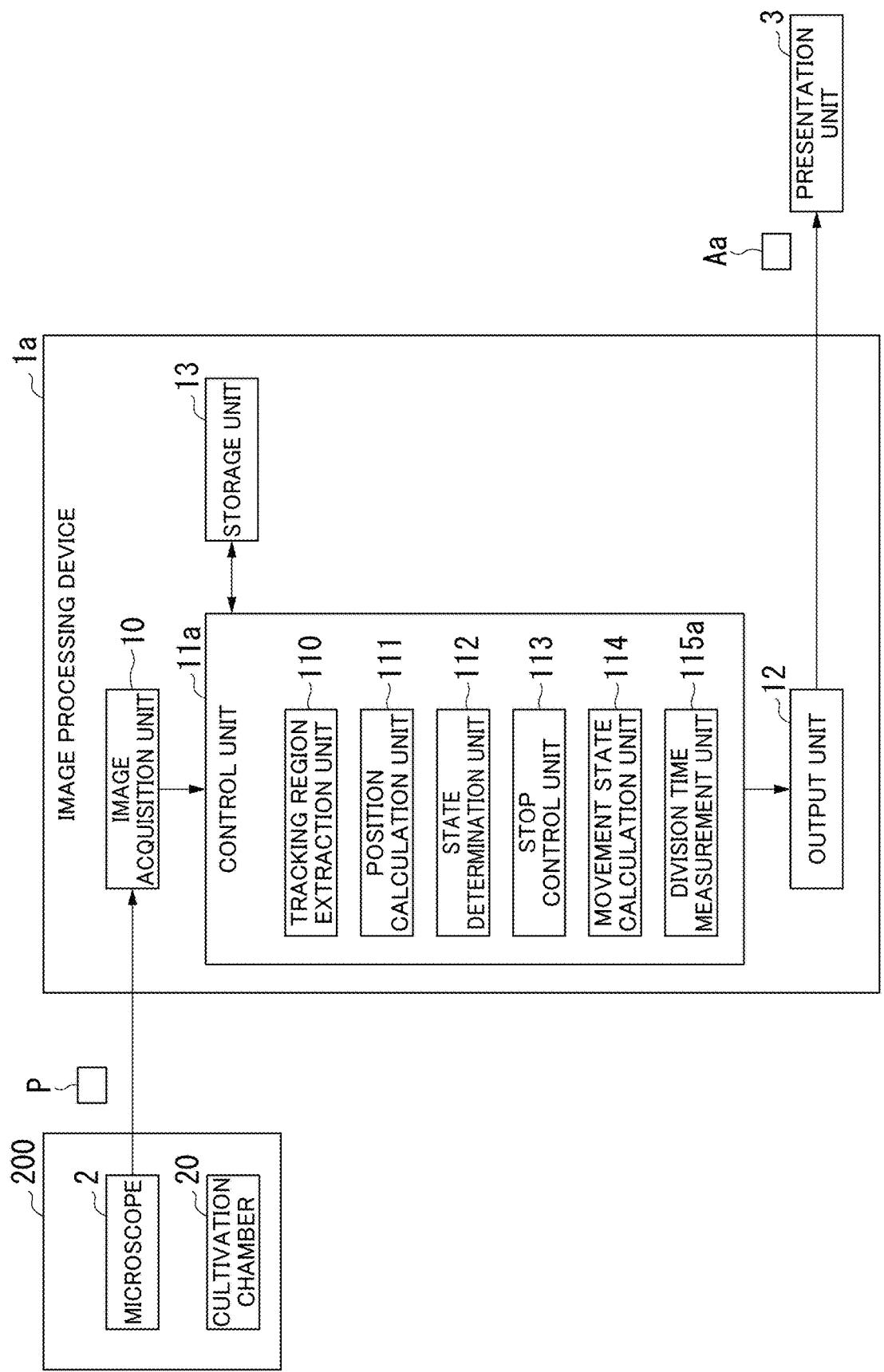
FIG. 10 is a diagram illustrating an example of a configuration of an image processing device according to a second embodiment.

FIG. 10 is a diagram illustrating an example of a configuration of the image processing device 1a according to the present embodiment. Comparing the image processing device 1a (FIG. 10) according to the present embodiment with the image processing device 1 (FIG. 1) according to the first embodiment, the control unit 11a is different. Here, functions included in the other components (the image acquisition unit 10, the output unit 12, and the storage unit 13) are the same as those in the first embodiment. Description of the same functions as those in the first embodiment will be omitted, and a part different from that in the first embodiment will be mainly described in the second embodiment.

The control unit 11a includes a tracking region extraction unit 110, a position calculation unit 111, a state determination unit 112, a stop control unit 113, a movement state calculation unit 114, and a division time measurement unit (time measurement unit) 115a. Functions included in the tracking region extraction unit 110, the position calculation unit 111, the state determination unit 112, the stop control unit 113, and the movement state calculation unit 114 are the same as those in the first embodiment.

A division time measurement unit 115a measures a floating time TD on the basis of the determination result of the state determination unit 112. Here, the floating time TD includes a length of time in which the state of the luminance indicated by the luminance information of the tracking region TR is the second state Y. The division time measurement unit 115a, for example, measures the floating time TD on the basis of the number of frames of the image P determined to be in the second state Y. Here, the division time measurement unit 115a, for example, converts the number of frames of the image P including the tracking region TR having a high luminance value on the basis of a frame rate interval to thereby measure the floating time TD.

Figure 11:
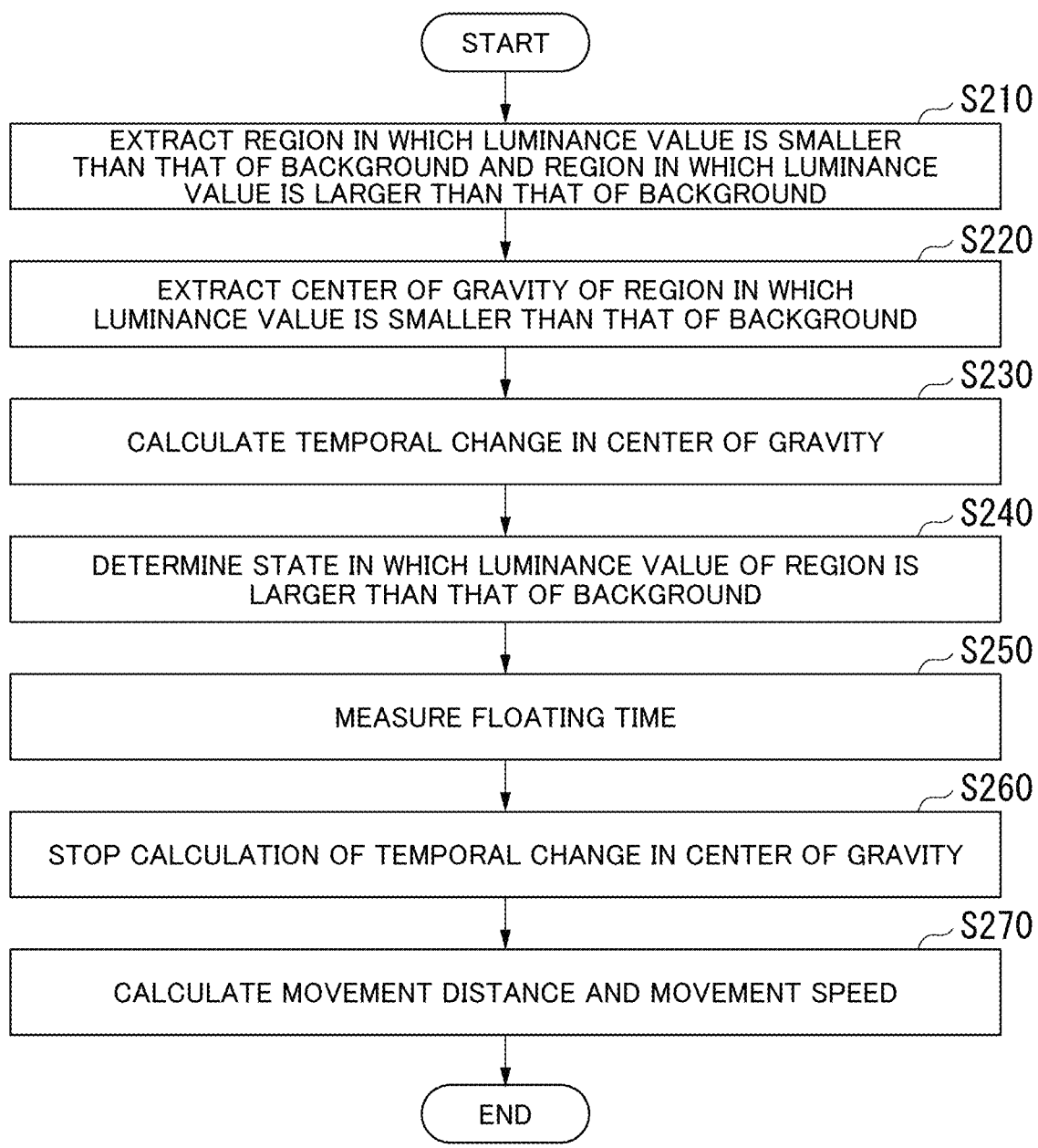
FIG. 11 is a diagram illustrating an example of a movement state calculation process according to the second embodiment.

Next, the movement state calculation process with the measurement of the floating time TD will be described with reference to FIG. 11. FIG. 11 is a diagram illustrating an example of a movement state calculation process according to the present embodiment. The movement state calculation process of FIG. 11 is executed in step S20 of the image processing of FIG. 5. Since respective processes of step S210, step S220, step S230, step S240, step S260, and step S270 are the same as the processes of step S110, step S120, step S130, step S140, step S150, and step S160 in FIG. 6, description thereof will be omitted.

Step S250: The division time measurement unit 115a measures the floating time TD on the basis of the determination result of the state determination unit 112. Here, the division time measurement unit 115a uses a plurality of frames to measure the floating time TD of the tracking region TR when a determination is made that the luminance value of the tracking region TR extracted by the tracking region extraction unit 110 is larger than that of the background BG of the image P.

As described in step S140 of FIG. 6, when the state determination unit 112 associates the tracking region TRi−1 in the (i−1)-th frame with the tracking stop region SRi in the i-th frame, the state determination unit 112 determines the tracking region TRi−1 has changed to the tracking stop region SRi. The division time measurement unit 115a starts the above-described region association process (also referred to as a dividing cell association process in this case) with respect to the tracking stop region SR on the basis of the determination result of the state determination unit 112.

The division time measurement unit 115a associates the tracking stop region SRi in the i-th frame with the tracking stop region SRi+1 in the (i+1)-th frame through the region association process. The division time measurement unit 115a ends the region association process when a tracking stop region SRi+2 in a (i+2)-th frame associated with the tracking stop region SRi+1 is not present.

The division time measurement unit 115a measures the number of frames from which the tracking stop regions SRi associated with each other in the region association process have been extracted as the floating time TD.

Figure 12:
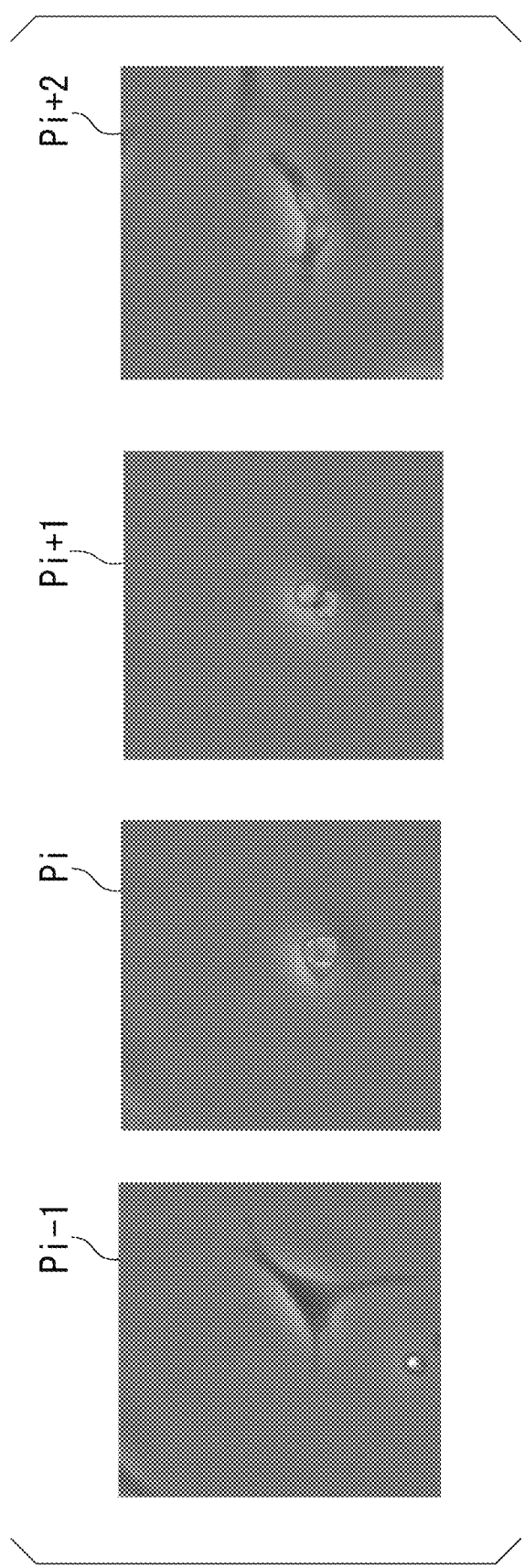
FIG. 12 is a diagram illustrating an example of an image used for measurement of a floating time according to the second embodiment.
Figure 13:
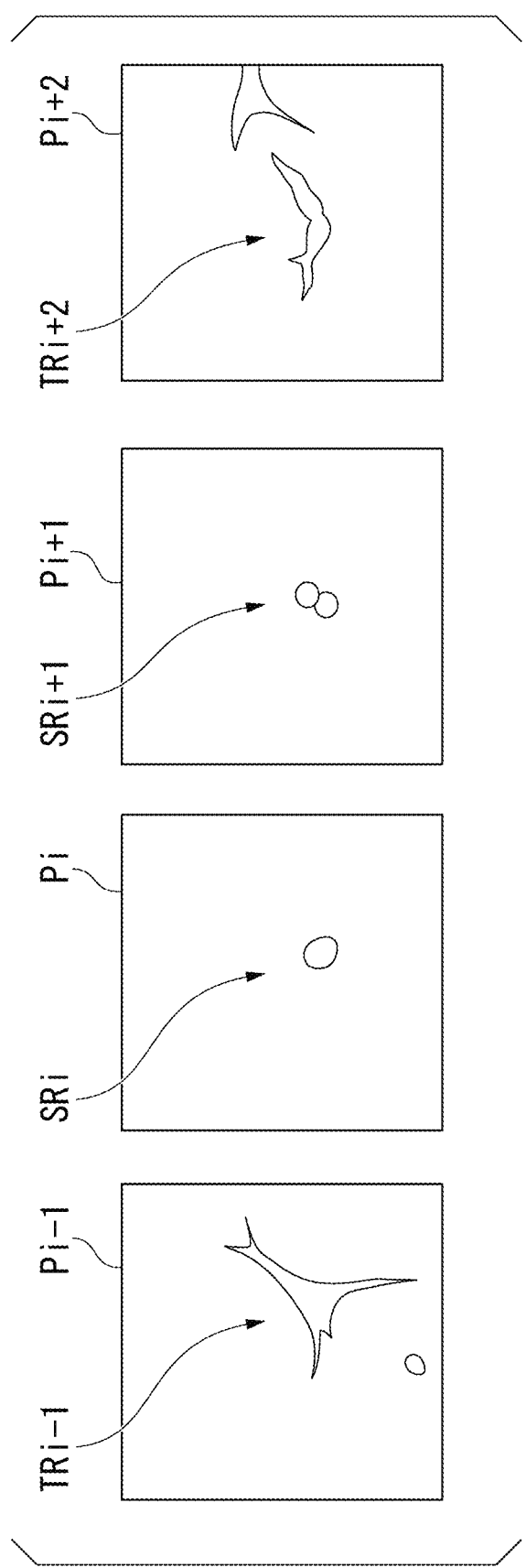
FIG. 13 is a diagram schematically illustrating the image of FIG. 12 in order to make the image illustrated in FIG. 12 easy to understand according to the second embodiment.

Here, an example of the measurement of the floating time TD will be described with reference to FIG. 12. FIG. 12 is a diagram illustrating an example of an image that is used for measurement of the floating time TD according to the present embodiment. FIG. 13 is a diagram in which the image of FIG. 12 is schematically drawn in order to make the image illustrated in FIG. 12 easy to understand. The image P of the present embodiment is a plurality of images (for example, an image Pi−1 and an image Pi) in which the cells C are detected at a plurality of times, as in the first embodiment. The image Pi−1, the image Pi, an image Pi+1, and an image Pi+2 illustrated in FIGS. 12 and 13 are the (i−1)-th frame, the i-th frame, the (i+1)-th frame, and the (i+2)-th frame in the image P, respectively. The tracking region extraction unit 110 extracts the tracking region TRi−1, the tracking stop region SRi, the tracking stop region SRi+1, and the tracking region TRi+2 from the image Pi−1, the image Pi, the image Pi+1, and the image Pi+2.

The state determination unit 112 associates the tracking region TRi−1 with the tracking stop region SRi, and determines that the tracking region TRi−1 has changed to the tracking stop region SRi. The division time measurement unit 115a starts the region association process on the basis of a determination result of the state determination unit 112. The division time measurement unit 115a associates the tracking stop region SRi with the tracking stop region SRi+1. Since the tracking stop region SR is not extracted from the image Pi+2, the division time measurement unit 115a ends the region association process.

The division time measurement unit 115a measures the number of frames from which the tracking stop region SRi associated in the region association process and the tracking stop region SRi+1 are extracted. The state determination unit 112 measures 2 that is the number of image Pi and the image Pi+1, as the floating time TD. The division time measurement unit 115a may convert the measured floating time TD from the number of frames (for example, 2 that is the number of image Pi and the image Pi+1) to time on the basis of the frame interval in the capturing of the image P.

In step S40 illustrated in FIG. 5, the output unit 12 outputs an analysis result Aa based on the floating time TD to the presentation unit 3. Further, the output unit 12 may output an analysis result including the movement state M of the tracking region TR and the floating time TD to the presentation unit 3.

Here, the floating time TD is considered to correspond to a length of an M phase (division phase) in the cell cycle. The division time measurement unit 115a tracks floating cells that appear at the time of division of the adherent cell to thereby estimate and measure the length of the M phase of the cell cycle. The control unit 11a can indirectly measure a duration of an M phase checkpoint by measuring the length of the M phase and evaluate an influence on the cells.

Figure 14:
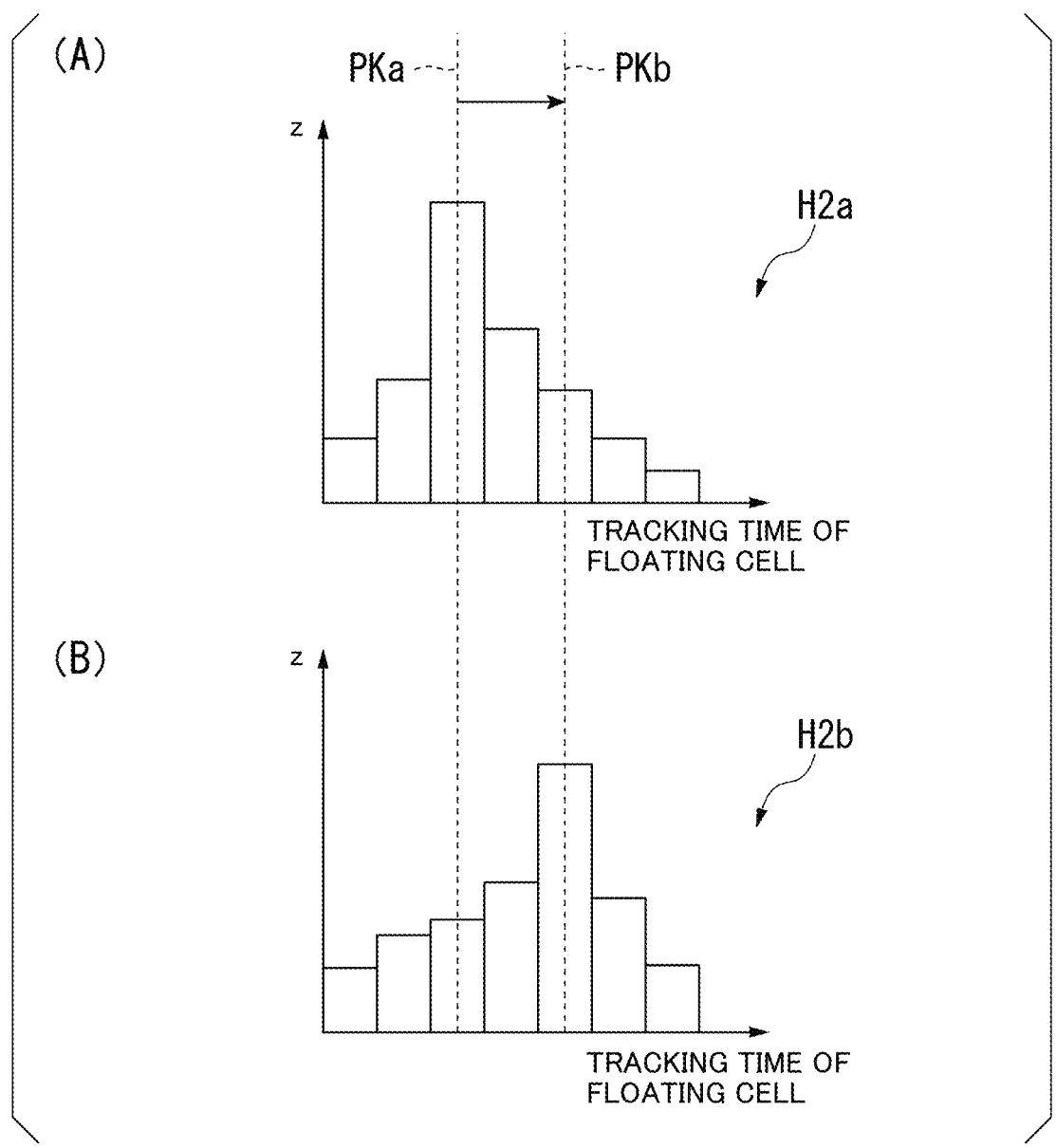
FIG. 14 is a diagram illustrating an example of a histogram of a floating time according to the second embodiment.

A specific example of the analysis result Aa of the floating time will be described herein with reference to FIG. 14. FIG. 14 is a diagram illustrating an example of a histogram of the floating time TD according to the present embodiment. In FIG. 14, as the analysis result Aa, a distribution of the floating time TD for the plurality of cells C are shown as a histogram H2a and a histogram H2b. In this histogram, the number Z of plurality of cells C is shown for each floating time TD.

FIG. 14(A) illustrates the histogram H2a of the floating time TD of a plurality of cells C under the reference cultivation condition. FIG. 14(B) illustrates the histogram H2b of the floating time TD of a plurality of cells C cultured under the first cultivation condition changed from the reference cultivation condition.

A peak PKb of the histogram H2b is in a position in which the floating time TD is longer than that of a peak PKa of the histogram H2a, and the floating time TD tends to be longer than the reference cultivation condition under the first cultivation condition.

For example, in the first cultivation condition, a period in which the cells C are in a floating state is likely to be longer than the reference cultivation condition, and the M phase checkpoint is likely not to operate normally as compared with the reference cultivation condition. Therefore, the image processing device 1a according to the present embodiment can evaluate an influence of cancer cellification or the like on the basis of the above analysis result Aa.

As described above, the image processing device 1a according to the present embodiment includes the time measurement unit (the division time measurement unit 115*a* in this example). The time measurement unit (the division time measurement unit 115*a* in this example) measures the time (the floating time TD) in which the state of the luminance indicated by the luminance information of the tracking region TR is the second state Y on the basis of the determination result of the state determination unit 112.

With this configuration, since the image processing device 1*a* according to the present embodiment, can estimate and measure the length of the M phase in the cell cycle using the floating time TD, it is possible to analyze the state of the cell on the basis of the length of the M phase.

Third Embodiment

Hereinafter, a third embodiment will be described in detail with reference to the drawings.

A case in which the image processing device associates a region before division with a plurality of regions after division when a region in an image is divided into a plurality of regions will be described in the present embodiment.

The image processing device according to the present embodiment is referred to as an image processing device 1*b*.

Figure 15:
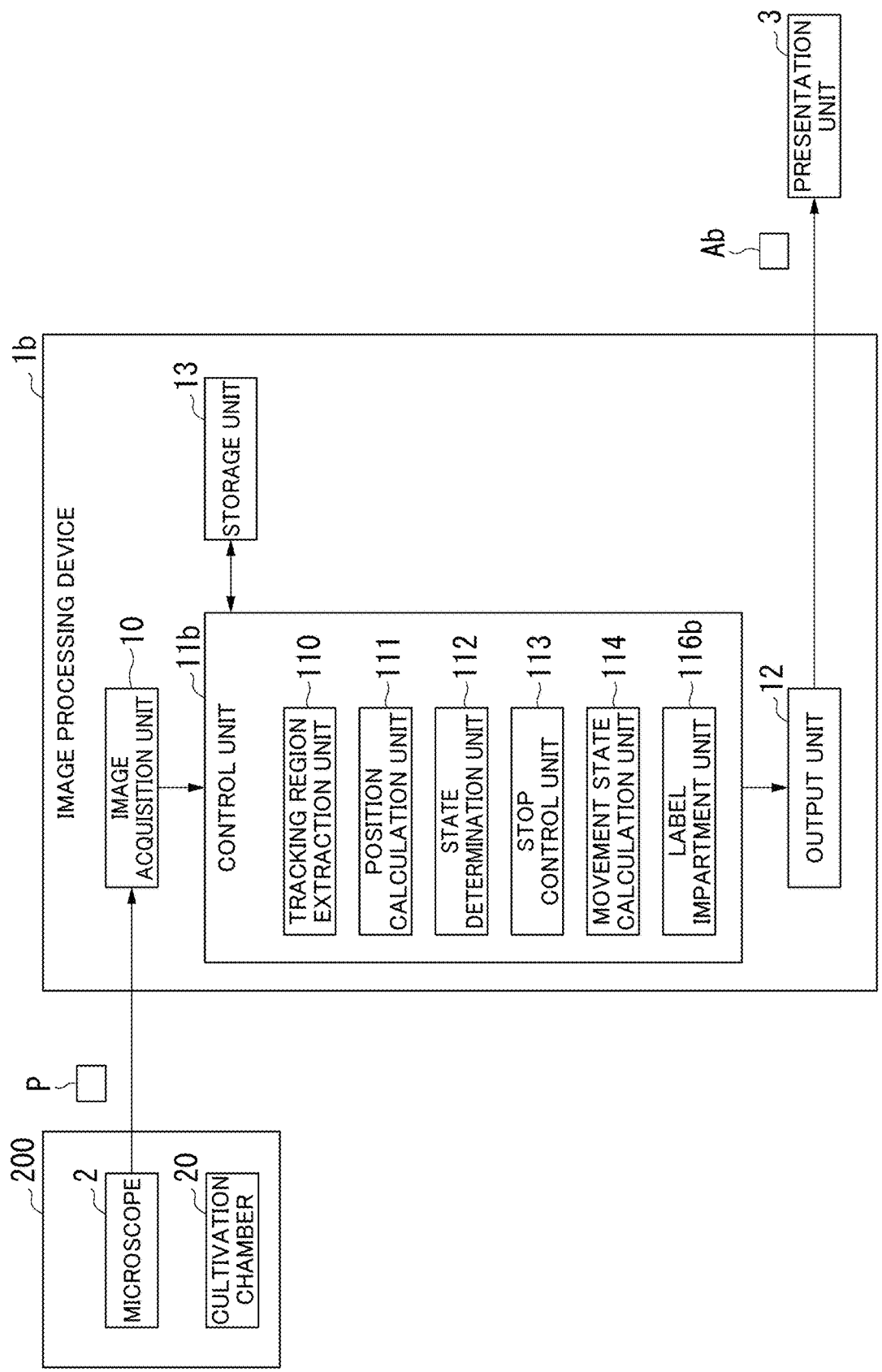
FIG. 15 is a diagram illustrating an example of a configuration of an image processing device according to a third embodiment.

FIG. 15 is a diagram illustrating an example of a configuration of the image processing device 1*b* according to the present embodiment. Comparing the image processing device 1*b* (FIG. 15) according to the present embodiment with the image processing device 1 (FIG. 1) according to the first embodiment, the control unit 11*b* is different. Here, functions of the other components (the image acquisition unit 10, the output unit 12, and the storage unit 13) are the same as those in the first embodiment. Description of the same functions as those of the first embodiment is omitted, and parts different from those in the first embodiment will be mainly described in the third embodiment.

The control unit 11*b* includes a tracking region extraction unit 110, a position calculation unit 111, a state determination unit 112, a stop control unit 113, a movement state calculation unit 114, and a label impartment unit 116*b*. Functions included in the tracking region extraction unit 110, the position calculation unit 111, the state determination unit 112, the stop control unit 113, and the movement state calculation unit 114 are the same as those in the first embodiment.

The label impartment unit 116*b* associates the regions R with each other between the different frames described above, and imparts a label (for example, a group number or an identifier) L for identifying an associated region R to the associated region R. Here, the region R to which the label impartment unit 116*b* imparts the label L includes the tracking region TR and the tracking stop region SR.

Figure 16:
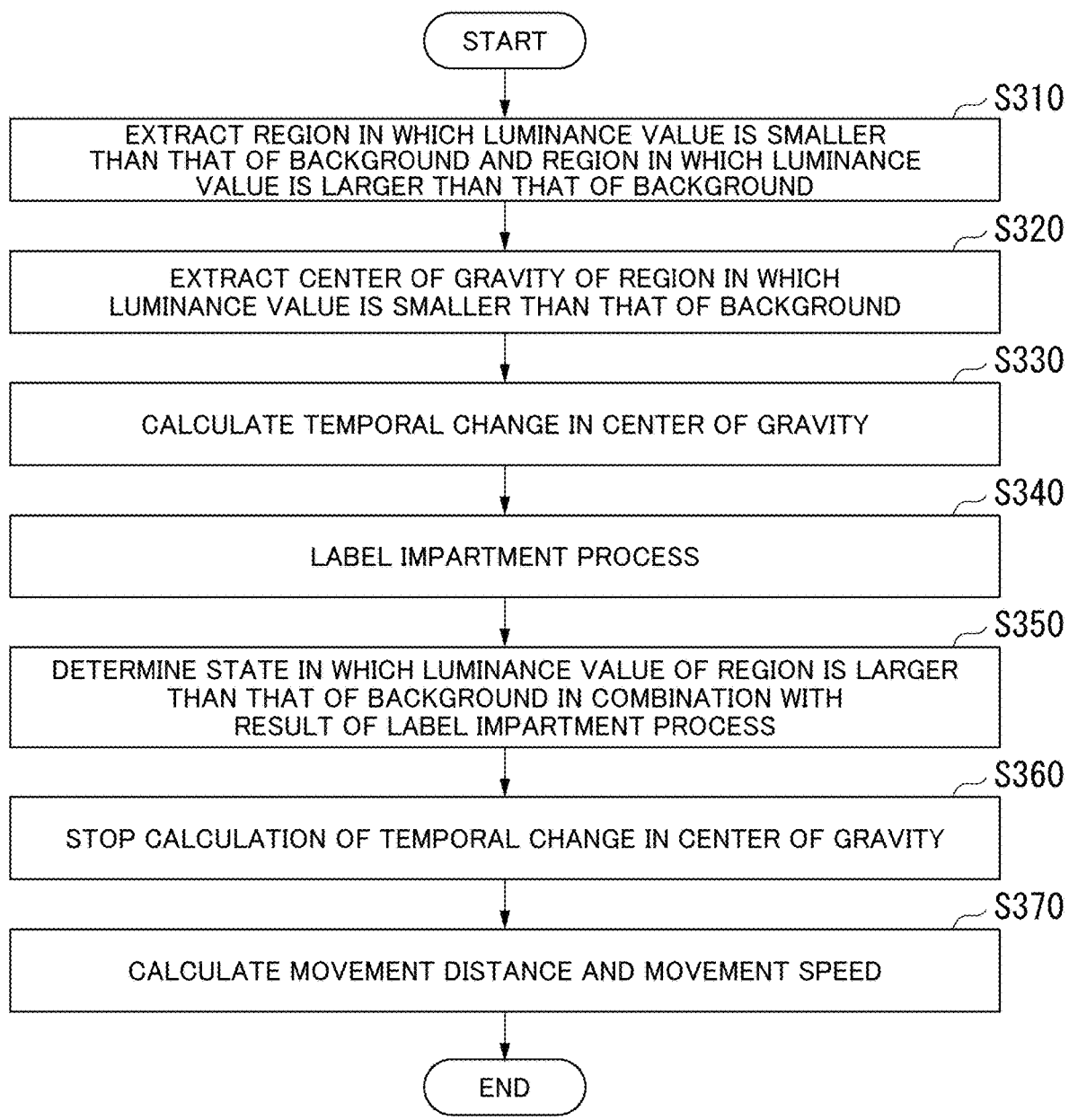
FIG. 16 is a diagram illustrating an example of a movement state calculation process according to a third embodiment.

A movement state calculation process with a label impartment process, which is a process in which the label L is imparted to the region R, will be described herein with reference to FIG. 16. FIG. 16 is a diagram illustrating an example of a movement state calculation process according to the present embodiment. The movement state calculation process in FIG. 16 is executed in step S20 of the image processing in FIG. 5.

Since respective processes of step S310, step S320, step S330, step S360, and step S370 are the same as the processes of step S110, step S120, step S130, step S150, and step S160 in FIG. 6, description thereof will be omitted.

Step S340: The label impartment unit 116*b* performs a label impartment process for imparting the label L to the associated region R. The label impartment unit 116*b* associates the region Ri−1 extracted in the (i−1)-th frame with the region Ri extracted in the i-th frame through the region association process described above.

Figure 17:
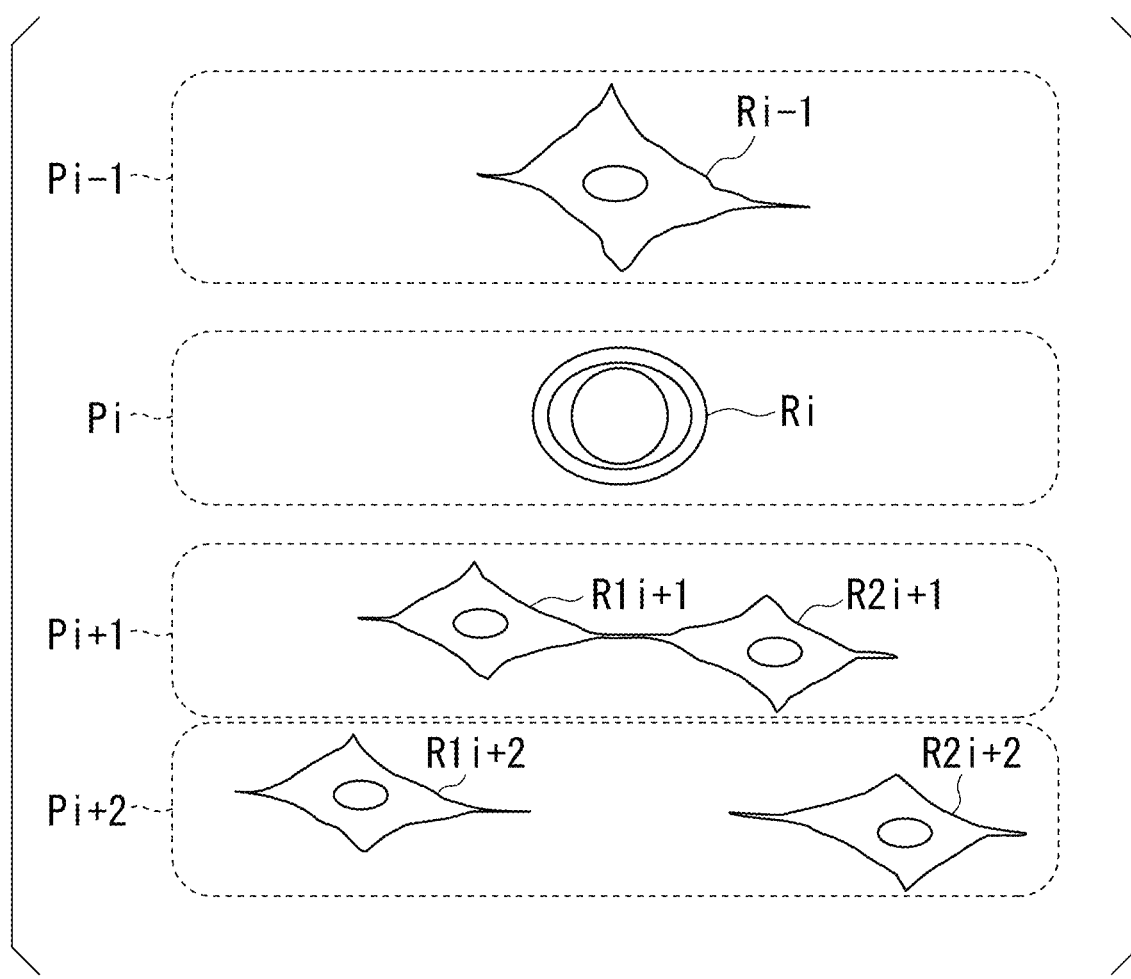
FIG. 17 is a diagram illustrating an example of a region association process according to the third embodiment.

Details of the region association process will be described herein with reference to FIG. 17. FIG. 17 is a diagram illustrating an example of a region association process according to the present embodiment. In FIG. 17, an image Pi−1 which is an (i−1)-th frame, an image Pi which is an i-th frame, an image Pi+1 which is an (i+1)-th frame, and an image Pi+2 which is an (i+2)-th frame are shown.

The label impartment unit 116*b* associates the region R1*i*+2 extracted in the (i+2)-th frame with the region R1*i*+1 extracted in the (i+1)-th frame through the region association process. Further, similarly, the label impartment unit 116*b* associates the region R2*i*+1 extracted in the (i+2)-th frame with the region R2*i*+1 extracted in the (i+1)-th frame through the region association process.

Further, the label impartment unit 116*b* associates the region R1*i*+1 extracted in the (i+1)-th frame with the region Ri extracted in the i-th frame through the region association process. Further, similarly, the label impartment unit 116*b* associates the region R2*i*+1 extracted in the (i+1)-th frame with the region Ri extracted in the i-th frame through the region association process. Here, the region Ri and the region R1*i*+1 are already associated with each other, but the label impartment unit 116*b* further associates the region R2*i*+1 with the region Ri.

That is, the label impartment unit 116*b* may associate a plurality of regions from the region Ri+1 extracted in the (i+1)-th frame with one region Ri extracted in the i-th frame.

The label impartment unit 116*b* associates the region Ri extracted in the i-th frame with the region Ri−1 extracted in the (i−1)-th frame through the region association process.

The label impartment unit 116*b* imparts the same label L to the associated region Ri−1, the region Ri, the region R1*i*+1, the region R2*i*+1, the region R1*i*+2, and a region R2*i*+2. That is, the label impartment unit 116*b* imparts the same label (for example, a first label L1) L to all the associated regions R to form one group. Here, the impartment of the label L to the region R means associating the region R with the label L.

The label impartment unit 116*b* may further impart the same label (for example, a second label L21) L to the region R1*i*+1 and the region R1*i*+2 to form one group, and impart the same label (for example, a second label L22) L to the region R2*i*+1 and the region R2*i*+2 to form one group. The impartment of the second label (for example, the second label L21 and the second label L22) makes it possible to identify a generation each time the cell C divides. Thus, the second label can be used as a label for identifying the generation of the cell C.

When the region R is the tracking region TR, the label impartment unit 116*b* may use a result of the region association process executed by the position calculation unit 111 in step S330 in the label impartment process.

Step S350: The state determination unit 112 determines that the luminance value of the tracking region TR extracted by the tracking region extraction unit 110 is larger than that of the background BG of the image P in combination with a result of the label impartment processing in step S340.

The state determination unit 112 determines, for example, that the tracking region TRi is divided into the region R1*i*+1 and the region R2*i*+1 using the label L. When the tracking region TRi is divided into two regions and the luminance value is larger than that of the background BG of the image P, the state determination unit 112 sets the determined tracking region TRi as the tracking stop region SRi.

The label impartment unit 116b may include information indicating the imparted label L in an analysis result Ab. That is, the analysis result Ab includes information on cell genealogy analysis.

In step S40 of FIG. 5, the output unit 12 outputs the analysis result Ab including the label L to the presentation unit 3.

In the image processing device 1b according to the present embodiment, since it can be determined that the cells have divided on the basis of the label L in cell tracking, it is possible to improve the analysis accuracy of the movement state M of the cell as compared with a case in which the label L is not used. Further, in the image processing device 1b according to the present embodiment, since it can be determined on the basis of the label L that the tracking region TRi extracted in the i-th frame is divided into the region R1i+1 extracted in the (i+1)-th frame and the region R2i+1, it is possible to perform cell genealogy analysis.

In each of the above-described embodiments, an example in which the microscope 2 is a phase contrast microscope has been described, but the present invention is not limited thereto. The microscope 2 may be a differential interference microscope. In the differential interference microscope, an optical path difference (for example, a difference in optical path length) of light (observation light) transmitted through the cell C is converted into contrast and a luminance value of the image is obtained. Therefore, when the microscope 2 is the differential interference microscope, the luminance indicated by the luminance information in the tracking region TR is a luminance value based on an optical path difference in the observation light. In this case, as an example, the first state X is a state in which the optical path difference is smaller than a predetermined value and the luminance value is smaller than the predetermined value, and the second state Y is a state in which the optical path difference is larger than the predetermined value and the luminance value is larger than the predetermined value.

Therefore, the luminance indicated by the luminance information of the tracking region TR is a luminance value based on the phase contrast or the optical path difference. Since the contrast of the tracking region TR is the phase contrast or the optical path difference, the image processing device 1 of each of the above-described embodiments can determine a state of the tracking region TR by using the phase contrast or the optical path difference as the contrast, so that a phase contrast image or an image captured by the differential interference microscope can be set as an analysis target.

A part of the image processing device 1, 1a, or 1b in the above-described embodiments, for example, the tracking region extraction unit 110, the position calculation unit 111, the state determination unit 112, the stop control unit 113, the movement state calculation unit 114, the division time measurement unit 115a, and the label impartment unit 116b may be realized by a computer such as a server or a client. In this case, the units may be realized by recording a program for realizing a control function thereof on a computer-readable recording medium, loading the program recorded on the recording medium into a computer system, and executing the program. Here, it is assumed that the "computer system" is a computer system built into the image processing devices 1, 1a, and 1b, which includes an OS or hardware such as a peripheral device. Further, the "computer-readable recording medium" refers to a portable medium such as a flexible disk, a magneto-optical disc, a ROM, or a CD-ROM, or a storage device such as a hard disk built into the computer system. Further, the "computer-readable recording medium" may also include a recording medium that dynamically holds a program for a short period of time, such as a communication line when the program is transmitted over a network such as the Internet or a communication line such as a telephone line or a recording medium that holds a program for a certain period of time, such as a volatile memory inside a computer system serving as a server or a client in such a case. Further, the program may be a program for realizing some of the above-described functions or may be a program capable of realizing the above-described functions in a combination with a program already recorded on the computer system.

For example, the present embodiment is a program for causing a computer to execute a region extraction step of extracting a tracking region TR of which a state of luminance indicated by luminance information is a first state X from an image of cells, a position calculation unit step of calculating a temporal change in a position of the tracking region TR extracted in the region extraction step on the basis of a plurality of the images, a state determination step of determining that the state of the luminance indicated by the luminance information of the tracking region TR extracted in the region extraction step is a second state Y different from the first state X, and a movement state calculation step of calculating a movement state of the tracking region TR on the basis of a calculation result of the position calculation unit step and a determination result of the state determination step.

For example, the present embodiment is a program for causing a computer to execute a region extraction step of extracting a tracking region TR of which a state of luminance indicated by luminance information is a first state X from an image of cells, a position calculation step of calculating a temporal change in a position of the tracking region TR extracted in the region extraction step on the basis of a plurality of the images, a state determination step of determining that the state of the luminance indicated by the luminance information of the tracking region TR extracted in the region extraction step is a second state Y different from the first state X, and a stop control step of stopping the calculation of the temporal change on the basis of a determination result of the state determination step.

Further, a part or all of the image processing devices 1, 1a and 1b in the embodiment described above may be realized as an integrated circuit such as a large scale integration (LSI). Respective functional blocks of the image processing devices 1, 1a, and 1b may be individually configured as processors, or some or all of the functional blocks may be integrated into a processor. Further, an integrated circuit realization scheme is not limited to the LSI, and the image processing devices may be realized by a dedicated circuit or a general-purpose processor. Further, in a case in which an integrated circuit realization technology with which the LSI is replaced appears with the advance of a semiconductor technology, an integrated circuit according to the technology may be used.

Although an embodiment of the present invention has been described in detail with reference to the drawings, a specific configuration is not limited to the above configuration, and various design changes and the like can be made without departing from the gist of the present invention.

REFERENCE SIGNS LIST 1, 1a, 1b Image processing device
1, 2 Microscope
110 Tracking region extraction unit 111 Position calculation unit
111, 112 State determination unit
113 Stop control unit
113, 114 Movement state calculation unit
115a Division time measurement unit
116b Label impartment unit
X First state
Y Second state
R Region
TR Tracking region
SR Tracking stop region

The invention claimed is:

1. A cell tracking method for performing tracking of a cell, which transitions between (i) a state of movement and (ii) a cell division state during which the cell floats immediately before dividing into a plurality of divided cells, based on a plurality of cell images captured in time series, the cell tracking method comprising:
    extracting a tracking region corresponding to the cell for each of the plurality of cell images based on luminance information of the cell images;
    calculating temporal change information in a position of the extracted tracking region based on the plurality of cell images and tracking the cell based on the calculated temporal change information;
    determining whether the cell is in the state of movement or in the cell division state by determining, based on the plurality of cell images, whether the tracking region is in a first state corresponding to the state of movement or in a second state corresponding to the cell division state; and
    analyzing a movement state of the cell based on the calculated temporal change information,
    wherein the position of the tracking region from when the tracking region is in the second state is excluded from the calculated temporal change information.

2. The cell tracking method according to claim 1,
    wherein the determining whether the tracking region is in the first state or the second state is performed based on a state of luminance of the tracking region indicated by the luminance information of the cell images, and
    the movement state of the cell is analyzed by (i) stopping the calculation of the temporal change information in the position of the tracking region when it is determined that the tracking region has changed from the first state to the second state and (ii) restarting the calculation of the temporal change information in the position of the tracking region when it is determined that the tracking region has changed from the second state to the first state.

3. The cell tracking method according to claim 2, wherein the analysis of the movement state of the cell includes analyzing a migration ability of the cell in comparison with a distribution of data of the temporal change information corresponding to the cell under a reference cultivation condition.

4. The cell tracking method according to claim 2, wherein the analysis of the movement state of the cell includes measuring a division time based on a result of the determining when it is determined that the cell is in the cell division state.

5. The cell tracking method according to claim 4, comprising analyzing a cell cycle of the cell, which is determined to be in the cell division state, in comparison with a distribution of data of the division time of the cell under a reference cultivation condition.

6. The cell tracking method according to claim 1, further comprising:
    storing, as tracking information, one or more of (i) a position of a center of gravity of the extracted tracking region, (ii) a calculation result of the tracking of the cell, (iii) a determination result of the determining, and an analysis result of the analysis of the movement state of the cell.

7. The cell tracking method according to claim 1, further comprising:
    imparting a label for identifying the extracted tracking region by imparting, in ones of the plurality of cell images at different imaging times before and after cell division of the cell, the same label to the tracking region through a region association process.

8. The cell tracking method according to claim 1, further comprising
    performing the extracting, calculating, determining, and analyzing for each of the plurality of divided cells.

9. An image processing device comprising:
    a processor for performing tracking of a cell, which transitions between (i) a state of movement and (ii) a cell division state during which the cell floats immediately before dividing into a plurality of divided cells, based on a plurality of cell images captured in time series; and
    a memory encoded with instructions executed by the processor, the instructions causing the processor to perform operations comprising:
    extracting a tracking region corresponding to the cell for each of the plurality of cell images based on luminance information of the cell images;
    calculating temporal change information in a position of the extracted tracking region based on the plurality of cell images and tracking the cell based on the calculated temporal change information;
    determining whether the cell is in the state of movement or in the cell division state by determining, based on the plurality of cell images, whether the tracking region is in a first state corresponding to the state of movement or in a second state corresponding to the cell division state; and
    analyzing a movement state of the cell based on the calculated temporal change information,
    wherein the position of the extracted tracking region from when the tracking region is in the second state is excluded from the calculated temporal change information.

10. The image processing device according to claim 9,
    wherein the instructions further cause the processor to perform operations comprising:
    determining whether the tracking region is in the first state or the second state based on a state of luminance of the tracking region indicated by the luminance information of the cell images, and
    analyzing the movement state of the cell by (i) stopping the calculation of the temporal change information in the position of the tracking region when it is determined that the tracking region has changed from the first state to the second state and (ii) restarting the calculation of the temporal change information in the position of the tracking region when it is determined that the tracking region has changed from the second state to the first state.

11. The image processing device according to claim 9, wherein the instructions further cause the processor to perform operations comprising:

imparting a label for identifying the extracted tracking region by imparting, in ones of the plurality of cell images at different imaging times before and after cell division of the cell, the same label to the tracking region through a region association process.

12. A non-transitory computer-readable medium storing a program for causing a computer for executing tracking of a cell, which transitions between (i) a state of movement and (ii) a cell division state during which the cell floats immediately before dividing into a plurality of divided cells, based on a plurality of cell images captured in time series to execute:

extracting a tracking region corresponding to the cell for each of the plurality of cell images based on luminance information of the cell images;

calculating temporal change information in a position of the extracted tracking region based on the plurality of cell images and tracking the cell based on the calculated temporal change information;

determining whether the cell is in the state of movement or in the cell division state by determining, based on the plurality of cell images, whether the tracking region is in a first state corresponding to the state of movement or in a second state corresponding to the cell division state; and analyzing a movement state of the cell based on the calculated temporal change information, wherein the position of the tracking region from when the tracking region is in the second state is excluded from the calculated temporal change information.

13. The non-transitory computer-readable medium according to claim 12, wherein the program further causes the computer to execute determining whether the tracking region is in the first state or the second state based on a state of luminance of the tracking region indicated by the luminance information of the cell images, and analyzing the movement state of the cell by (i) stopping the calculation of the temporal change information in the position of the tracking region when it is determined that the tracking region has changed from the first state to the second state and (ii) restarting the calculation of the temporal change information in the position of the tracking region when it is determined that the tracking region has changed from the second state to the first state.

* * * * *